(12) United States Patent
Mitlin et al.

(10) Patent No.: US 10,950,866 B2
(45) Date of Patent: Mar. 16, 2021

(54) BATTERY WITH ACTIVE MATERIALS STORED ON OR IN CARBON NANOSHEETS

(71) Applicant: Sparkle Power LLC, Rochester, NY (US)

(72) Inventors: David Mitlin, Hannawa Falls, NY (US); Jia Ding, Edmonton (CA)

(73) Assignee: Sparkle Power LLC, Rochester, NY (US)

(*) Notice: Subject to any disclaimer, the term of this patent is extended or adjusted under 35 U.S.C. 154(b) by 207 days.

(21) Appl. No.: 15/465,199

(22) Filed: Mar. 21, 2017

(65) Prior Publication Data

US 2018/0277853 A1 Sep. 27, 2018

(51) Int. Cl.

| H01M 4/66 | (2006.01) |
|---|---|
| H01M 10/0525 | (2010.01) |
| H01M 4/38 | (2006.01) |
| H01M 4/48 | (2010.01) |
| H01M 4/485 | (2010.01) |
| H01M 4/58 | (2010.01) |
| H01M 4/133 | (2010.01) |
| H01M 4/134 | (2010.01) |
| H01M 4/36 | (2006.01) |
| H01M 4/587 | (2010.01) |

(52) U.S. Cl.
CPC .......... *H01M 4/663* (2013.01); *H01M 4/133* (2013.01); *H01M 4/134* (2013.01); *H01M 4/362* (2013.01); *H01M 4/38* (2013.01); *H01M 4/386* (2013.01); *H01M 4/387* (2013.01); *H01M 4/485* (2013.01); *H01M 4/587* (2013.01); *H01M 4/5815* (2013.01); *H01M 10/0525* (2013.01); *Y02E 60/10* (2013.01); *Y02T 10/70* (2013.01)

(58) Field of Classification Search
CPC ...... H01M 4/663; H01M 4/587; H01M 4/387; H01M 4/386; H01M 4/362; H01M 4/134; H01M 4/133; H01M 4/38; H01M 4/5815; H01M 4/485; H01M 10/0525; H01M 4/48

See application file for complete search history.

(56) References Cited

U.S. PATENT DOCUMENTS

2006/0127773 A1* 6/2006 Kawakami ............ H01M 4/134
    429/245
2010/0255377 A1* 10/2010 Tsubata ................. H01M 4/587
    429/231.8

(Continued)

OTHER PUBLICATIONS

Zhou et al., "Amorphous, Crystalline and Crystalline/Amorphous Selenium Nanowires and Their Different (De)Lithiation Mechanisms," Sep. 22, 2015, Chemistry of Materials, 27, 6730-6736. (Year: 2015).*

(Continued)

*Primary Examiner* — Ula C Ruddock
*Assistant Examiner* — Matthew W Van Oudenaren
(74) *Attorney, Agent, or Firm* — Murtha Cullina LLP

(57) ABSTRACT

An energy storage device including an anode, a cathode, at least one of the anode and the cathode including a carbon nanosheet having an active material, such as selenium, in and/or on the carbon nanosheet, and an electrolyte. A carbon material including a carbon nanosheet derived from a biological precursor, such as nanocrystalline cellulose, including a plurality of micropores and an active material impregnated into at least a portion of the micropores of the carbon nanosheet.

27 Claims, 20 Drawing Sheets

(56) References Cited

U.S. PATENT DOCUMENTS

| | | | |
|---|---|---|---|
| 2012/0077074 A1* | 3/2012 | Hoshina | C01G 23/005 |
| | | | 429/149 |
| 2012/0202120 A1* | 8/2012 | Kim | B82Y 30/00 |
| | | | 429/231.1 |
| 2012/0244357 A1* | 9/2012 | Leung | C08B 15/04 |
| | | | 428/402 |
| 2013/0224601 A1* | 8/2013 | Burnside | H01M 4/805 |
| | | | 429/237 |
| 2014/0328006 A1* | 11/2014 | Mitlin | H01G 11/36 |
| | | | 361/502 |
| 2015/0050522 A1* | 2/2015 | Manthiram | H01M 4/131 |
| | | | 429/7 |
| 2016/0039680 A1* | 2/2016 | Jacob | C01B 32/324 |
| | | | 427/122 |
| 2016/0043384 A1* | 2/2016 | Zhamu | H01M 4/133 |
| | | | 429/231.4 |

OTHER PUBLICATIONS

Wang et al., "Hydrothermal preparation of highly porous carbon spheres from hemp (*Cannabis sativa* L.) stem hemicellulose for use in energy-related applications," Industrial Crops and Products, Available Online Dec. 18, 2014, 65, 216-226. (Year: 2014).*

* cited by examiner

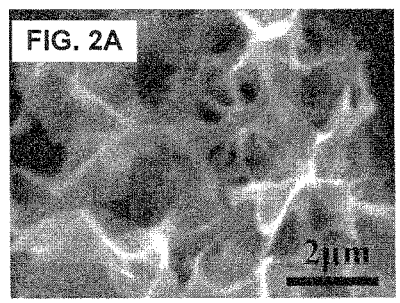
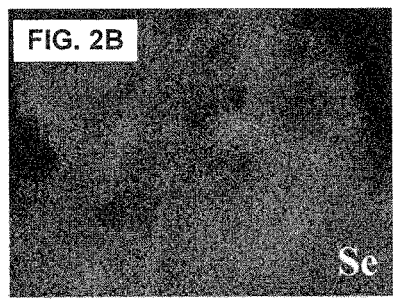
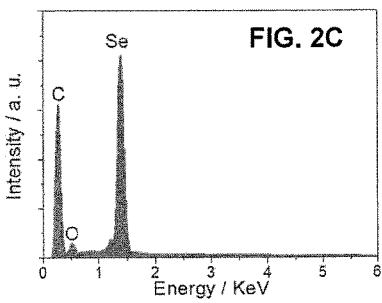
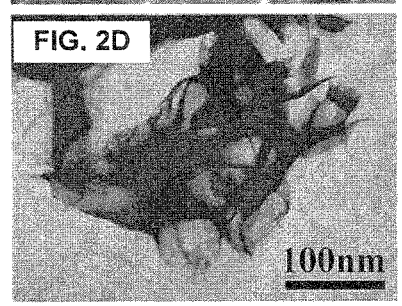
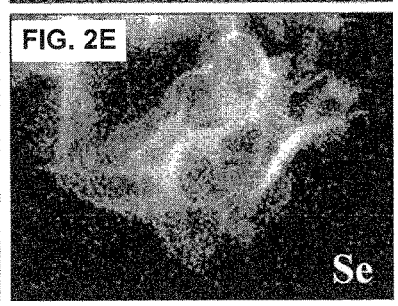
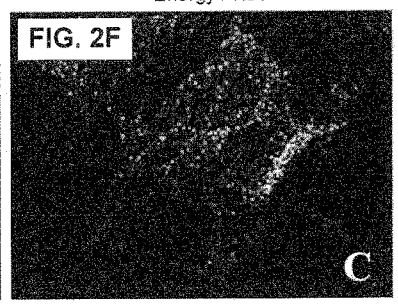

BATTERY WITH ACTIVE MATERIALS STORED ON OR IN CARBON NANOSHEETS

FIELD OF THE INVENTION

The invention relates to carbons and their use in energy storage devices, and more specifically to a carbon nanosheets for use in energy storage devices with active materials stored on and/or in the carbon nanosheets.

BACKGROUND OF THE INVENTION

Lithium-ion batteries (LIBs) are rapidly advancing as an essential green energy technology powering electric vehicles, plug-in hybrid vehicles, portable electronics and grid energy storage. Sodium-ion batteries (NIBs, SIBs) have also garnered increasing interest because of the low cost and geographically wide-spread terrestrial reserves of sodium. Unfortunately, insufficient energy density of the devices becomes a critical limiting factor for the wider applications of both systems.

To address this energy-density deficit, researchers are developing the next generation of electrode materials with a higher specific capacity. Certain success has been achieved on the anode side by replacing traditional graphite with silicon (Si)-based electrodes for LIBs and tin (Sn)-based electrodes for NIBs (among many other candidate materials). However, the gravimetric capacity of both LIB and NIB cathodes remains lower than that of graphite or other anode materials. For instance, most of the Li-ion intercalation-based cathodes (e.g., LCO, NCA, and LFP) yield capacities below 200 mA h $g^{-1}$. For NIBs the cathode capacities are generally even less, being in the 150 mA h $g^{-1}$ range at most.

One approach for achieving a significantly higher cathode capacity, albeit at the expense of a narrower voltage window, is to utilize the reaction between lithium (Li) and sulfur (S). S-based conversion cathodes have the potential to provide 2-5 times the energy density of traditional intercalation LIB cathodes. However, these systems face major challenges in terms of Coulombic efficiency, rate performance and cycling stability.

Sulfur is both ionically and electrically insulating, with the lithium polysulfide discharge products being electrically insulating as well. This leads to low utilization of the active sulfur. Moreover, significant capacity decay is endemic, being in part caused by the shuttle mechanisms of the intermediate discharge products. To reduce the polysulfide shuttle effect, low-order sulfur species have been employed, which yield polysulfides with reduced solubility in the carbonate electrolytes. It has also been possible to restrict the motion of the active sulfur by physically trapping it within various matrices (e.g. carbons and metal oxides) and/or promoting stronger chemical bonding between sulfur species and the matrix by changing its surface chemistry. Early work on Na—S showed its utility for high temperature battery applications. Recently, several studies have shown a potential path toward ambient temperature Na—S systems as well. For instance, in one study, a membrane-electrode-assembly (MEA) comprised of a carbon-coated, presodiated Nafion membrane and a sodium sulfide cathode was created. Another study used a microporous carbon—sulfur composite cathode, and a custom electrolyte based on ionic liquid 1-methyl-3-propylimidazolium-chlorate tethered to $SiO_2$ nanoparticles.

Selenium (Se) has similar chemical properties to sulfur but much higher electrical conductivity ($1\times10^{-3}$ vs. $0.5\times10^{-27}$ S $m^{-1}$). Although selenium has a lower gravimetric capacity with Na/Li than sulfur, it has comparable volumetric capacity; an important factor for devices where space is limited. Similar to sulfur cathodes, the shuttle effect also exists for selenium cathodes, leading to cycling deterioration. Selenium also possesses a much higher reaction activity with Na at room temperature, making it a desirable choice for ambient applications. Therefore, Se has been regarded as another promising cathode material for both sodium ion batteries and lithium ion batteries.

There have only been a limited number of Na—Se publications, and all employ fundamentally different approaches than the present invention. In C. Luo et al. (2015), a Se was created in a carbon system through in situ carbonization of perylene-3,4,9,10-tetracarboxylic dianhydride (PTCDA) and selenium (Se) in a sealed vacuum glass tube. The ultimate mass loading of Se was 54%, the highest reported for a Na—Se system. The resultant "in situ formed Se/C composite" consisted of relatively coarse particulates with a blocky morphology resembling that of activated carbon. The Se/C particles were on the scale of 1 micron. The carbon host was graphitic and the Se was at least in part crystalline. In C. Luo et al. (2013), the authors began with mesoporous carbon spheres obtained by carbonizing resorcinol combined with a triblock copolymer and formaldehyde, followed by activation. The spheres were several microns in diameter, possessed a BET surface area of 462 $m^2$ $g^{-1}$, and a pore volume of 0.2 $cm^3$ $g^{-1}$. The Se was impregnated into the carbon with a mass loading of 30% via vacuum annealing. C. Luo et al. (2013) reports that in the impregnated state the Se remained crystalline and the carbon host was partially graphitized.

In L. Zeng et al. (2015), Pluronic F127/N,N-dimethylformamide (PAN-F127/DMF) was used as the carbon precursor which was electrospun into fibers that were 400 nm thick and were tens of microns in length. The fibers were annealed at 280 C, then carbonized in nitrogen at 800 C and finally chemically activated with KOH. The final carbon host possessed analogous length dimensions to the as-spun fibers but appeared somewhat thinner, in the 300 nm range according to the micrographs provided. Se was then infiltrated through a co-heating process in a sealed environment. Before infiltration the fibers possessed a BET surface area of 936 $m^2$ $g^{-1}$. Following infiltration the fibers still had unfilled porosity, the surface area being 85 $m^2$ $g^{-1}$. The starting fibers were mesoporous, with channel-like porosity, which were partially filled with Se. The Se loading was 52% and 50%. The same research group utilized carbonized electro-spun polyacrylonitrile (PAN)-CNT nanofibers as the Se host, along with carbon nanotubes as a supporting phase. The morphology and structure of the Se-in-fiber electrodes (35% Se loading), as well as the resultant electrochemical performance in a half-cell, are analogous to their other study. In H. Wang et al. (2014), electro-spun polyacrylonitrile/selenium (CPAN/Se) was carbonized and then co-annealed it with Se in a vacuum. The fibers were approximately 1000 nm thick, while the Se mass loading was 36%. The fibers were not activated and there is no porosity reported.

What is desired, therefore, are improved carbon materials for use in energy storage devices such as lithium ion and sodium ion batteries.

SUMMARY OF THE INVENTION

Accordingly, it is an object of the present invention to provide new and improved batteries incorporating a range of Li and Na active materials on and/or in carbon nanosheets.

In one exemplary embodiment, the present invention provides a carbon material including a carbon nanosheet derived from a biological and/or plant-based precursor, such as nanocrystalline cellulose, including a plurality of micropores and an active material impregnated into at least a portion of the micropores of the carbon nanosheet. The carbon material may be employed as an electrode. In some embodiments, the active material is amorphous and fills about ¼ of the pores of the carbon nanosheet.

The active material may be impregnated into carbon nanosheets by a method according to the present invention involving co-milling, co-mixing, co-rolling, co-physical depositing, co-casting, co-slurry processing, wet impregnation, co-annealing, chemical vapor deposition, plasma enhanced chemical vapor depiction, atomic layer deposition, physical vapor depiction, evaporation, sputtering, sol-gel processing, electrochemical methods, chemical methods wet and dry, electroless deposition, plating. Phases may be any material that is Li, Na, K, Al or Mg active, or a combination of one or several active and inactive phases. The morphology of the phases may be thin films or various 2D and 3D geometries, including nanowires, nanotubes, nanospheres, nanoparticulates, nanopowders, microwires, microtubes, microspheres, microparticulates, micropowders.

In one embodiment, the active material is selenium (Se) which is amorphous. The elastically compliant two-dimensional carbon nanosheet host incorporates a high mass loading of the amorphous Se (53 wt %), which is primarily impregnated into 1 $cm^3$ $g^{-1}$ nanopores. The results in facile sodiation kinetics due to short solid-state diffusion distances and a large charge transfer area of the nanosheets were established. The architecture also leads to an intrinsic resistance to polyselenide shuttle and to disintegration/coarsening.

The present invention further provides an energy storage device including a cathode, an anode, and an electrolyte, at least one of the cathode and the anode including a carbon nanosheet having an active material in and/or on the carbon nanosheet. In some embodiments, the carbon nanosheet is a cellulose-derived carbon nanosheet with the active material in pores of the carbon nanosheet. For example, a renewable tree-derived nanocrystalline cellulose (NCC) precursor may be used. In other embodiments one or a combination of lignin, starch, crude fiber, hemicellulose, sugar, ash, amorphous cellulose, pectin may be used as a precursor. Examples of other precursors are fibrous plants such as flax, hemp, jute, ramie, nettle, kenaf, marijuana or cannabis. In some embodiments, the carbon nanosheets are created by hydrothermally treating the NCC followed by KOH activation. In other embodiments a combination of pyrolysis and activation is employed. The electrolyte may be, for example, sodium ions or lithium ions. Other carbon geometries include plate-like, microsheets, ruffled sheet, various 2D structures with a lateral width to thickness ratio of 10 or greater, graphite sheet, soft carbon sheet, hard carbon sheet, mixed graphite and amorphous sheet.

The energy storage device may a sodium ion battery or capacitor, a lithium ion battery or capacitor, an ultracapacitor, or a hybrid ion capacitor. The energy storage device may be embodied in a number of different forms, such as a D-cell battery, a pouch cell, a rectangular automotive starter battery scale cell, a C-cell sized battery, an AA-cell sized battery, an AAA-cell sized battery, a 18650 lithium ion battery, and a 26650 lithium ion battery.

In one embodiment, the carbon nanosheet is the cathode of the energy storage device, the anode is a pseudographitic carbon (PGC) including partially ordered domains of graphene with an interlayer spacing larger than that of graphite, and the active material is selenium (Se). The Se is primarily impregnated into micropores of the carbon nanosheet.

As a Na half-cell, the Se-CCN cathode according to the present invention delivers a reversible capacity of 613 mA h $g^{-1}$ with 88% retention over 500 cycles. In some embodiments, the exceptional stability is achieved by using a standard electrolyte (1 M $NaClO_4$ EC-DMC) without secondary additives or high salt concentrations. The rate capability is also superb, achieving 300 mA h $g^{-1}$ at 10 C. Compared to recent state-of-the-art literature, the Se-CCN is the most cyclically stable and offers the highest rate performance. Embodiments employed in an Se—Na battery have been found to achieve 992 W h $kg^{-1}$ at 68 W $kg^{-1}$ and 384 W h $kg^{-1}$ at 10 144 W $kg^{-1}$ (by active mass in a cathode).

The PGC anode increases its structural order in addition to dilating as a result of Na intercalation at voltages below 0.2 V vs. Na/Na+. The {110} Na reflections are distinctly absent from the XRD patterns of PGC sodiated down to 0.001 V, indicating that the Na metal pore filling is not significant for pseudographitic carbons. Batteries according to the present invention deliver highly promising Ragone chart characteristics, for example yielding 203 and 50 W h $kg^{-1}$ at 70 and 14 000 W $kg^{-1}$ (via total material mass in the anode and cathode).

Other objects of the invention and its particular features and advantages will become more apparent from consideration of the following drawings and accompanying detailed description.

BRIEF DESCRIPTION OF THE DRAWINGS

FIGS. 2A-2F show an as synthesized Se-cellulose derived carbon nanosheet (Se-CCN) according to the present invention, including an SEM micrograph in FIG. 2A, an SEM EDX Se map of the same region in FIG. 2B, a full SEM EDX spectrum obtained from that region in FIG. 2C, a TEM bright field micrograph of Se-CCN in FIG. 2D, and associated TEM EDX maps of selenium and carbon in FIGS. 2E and 2F, respectively.

FIG. 19A shows cyclic voltammograms (CVs) of Se/NCC against lithium, FIG. 19B shows galvanostatic discharge/charge profiles of Se/NCC, tested at 0.2C. FIG. 19C shows cyclability of Se/NCC at 0.2C. FIG. 19D shows Nyquist plots of Se/NCC cathodes in Li and sodium cells before tests and after 500 cycles. FIG. 19E shows rate performance of Se/NCC with rates from 0.1 to 20C. FIG. 19F shows changes in the shape of discharge/charge profiles of Se/NCC cathodes at different C rates.

DETAILED DESCRIPTION OF THE INVENTION

Figure 1:
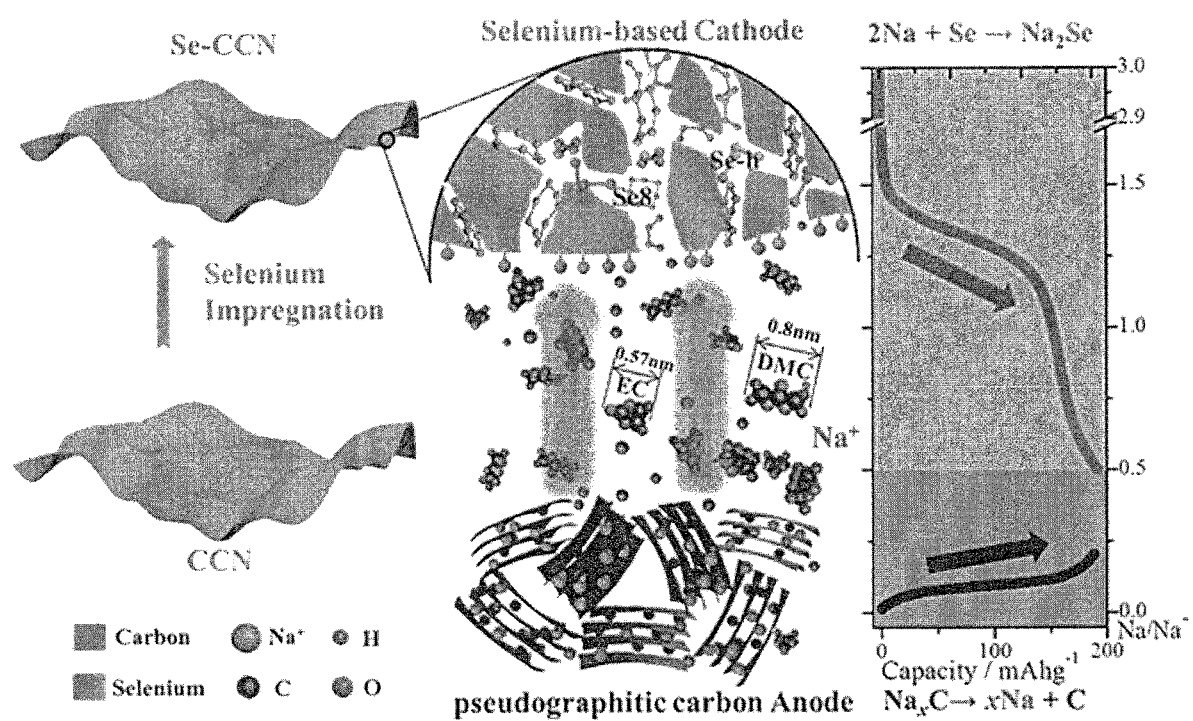
FIG. 1 is a schematic illustration of an Se-CCN structure according to the present invention (left), its operation versus a pseudographitic carbon (PGC) anode in a full sodium ion battery (center), and the voltage vs. capacity behavior of both electrodes (right).

The present invention relates to Li and Na active materials on and/or in carbon nanosheets, and energy storage devices comprising such carbon nanosheets. The active materials are distributed on the surface of the carbon nanosheets, intermixed with the carbon nanosheets, arranged in the pores of the carbon nanosheets, or a combination of these.

In one advantageous embodiment, discussed herein, the active material is selenium (Se). However, the active material also may be sulfur (S), metal sulfides, silicon (Si), tin (Sn), antimony (Sb), germanium (Ge), and/or compounds or alloys thereof. The active material may also be titanium oxide ($TiO_2$) and/or $Li_xTi_yO_z$ compounds (e.g., $Li_4Ti_5O_{12}$ or LTO). Further, the active material may be, for example, LFP (lithium iron phosphate, $LiFePO_4$); NCM (lithium nickel cobalt manganese oxide, $LiNiCoMnO_2$); NCA (lithium nickel cobalt aluminum oxide, $LiNiCoAlO_2$); LMO (lithium manganese oxide, $LiMn_2O_4$), LCO (lithium cobalt oxide, $LiCoO_2$); $Li_2MnO_3$; vanadates; Mn-oxide based/oxides containing Li and Co and/or Ni and/of Mn and/of Fe, and/or Al, etc; complex oxides containing Li or Na with a voltage profile suitable for cathode materials; pre-lithiating agents such as stabilized Li power, Li fluorides, Li conversion compounds, Li sulfides, etc. In some embodiments, the active material is one of CoSb, $LiCoO_2$, $LiCoPO_4$, $LiFeO_2$, $LiFePO_4$, $Li_2FeSiO_4$, $LiMnO_2$, $Li_2Mn_3NiO_8$, $Li_2Mn_3NiO_8$, $LiMn_2O_4$, $Li_2MoO_4$, $LiNi_{0.8}Co_{0.15}Al_{0.05}O_2$, $LiNi_{0.8}Co_{0.15}Al_{0.05}O_2$, $LiNi_{0.8}Co_{0.2}O_2$, $LiNiO_2$, $LiNi_{0.33}Mn_{0.33}Co_{0.33}O_2$, $LiNi_{0.33}Mn_{0.33}Co_{0.33}O_2$, or $Mn_{0.75}Ni_{0.25}CO_3$.

The carbon nanosheets according to the present invention may also support and/or host graphite, graphene, graphene related carbons, hard carbons or soft carbons, amorphous carbons. The carbon nanosheets may also support/host any of the above combinations, e.g., Si—Ge alloy with graphene.

In some exemplary embodiments, the carbon nanosheet is a cellulose derived nanosheet. The cellulose may be derived from plant matter, such as from trees, grass, or agricultural by products. Cellulose may also be derived from algae. In one embodiment, the carbon nanosheet framework is synthesized from a nanocrystalline cellulose (NCC) precursor by combining hydrothermal processing and KOH heat treatment to exfoliate, carbonize and activate the NCC into highly porous sheet-like carbons.

The active material is preferably infiltrated into or on the carbon nanosheet. Active materials, such as selenium, may be impregnated into carbon nanosheets by methods according to the present invention. In one exemplary embodiment, an active material (e.g., Se) is loaded into pores of the carbon nanosheets through a two-step impregnation-annealing process. The first step is a selenium-infiltration process at a temperature of 260° C., which is above its melting point of 221° C. The second step is a 600° C. soak that removes the residual selenium not wetted into the pores. This likely enhances the strength of the carbon—selenium bonds inside the pores.

The resultant selenium in the cellulose-derived carbon nanosheet, termed and referred to herein as "Se-CCN," microstructure is unique. In some embodiments, the macroscopically open electrode architecture consists of large carbon sheets arranged in three-dimensions, with the active material (e.g., Se) impregnated into the nanopores. The pore volume in the carbon nanosheets is high relative to other classes of host carbons. In one embodiment, the pore volume is at least 1 cm$^3$ g$^{-1}$ and with a surface area of 1610 m$^2$ g$^{-1}$. The carbon nanosheet thickness is typically 100 nm or less, while its horizontal dimensions are in microns, making the architecture highly elastically compliant. In another embodiment chemical vapor deposition is used to cover and or impregnate the nanosheets with Si or doped Si. In another embodiment pure or doped Si nanowires or other 1D, 2D or 3D nanostructures are grown using the nanosheets as substrates. In another embodiment Si nanopowders are intimately co-mixed with the sheets. In another embodiment the active material eliminates the majority if the porosity in the carbon, giving the final structure a low surface area such as 1 m$^2$/g up to 100 m$^2$/g. In another embodiment a combination of processes is employed to introduce the other phases(s). The secondary material may be X-ray amorphous, nanocrystalline, microcrystalline, or a combination of thereof.

In some exemplary embodiments, the impregnated active material (e.g., Se) is fully X-ray amorphous, with no evidence that an equilibrium hexagonal phase is present. However the carbon nanosheet may also be micro or nanocrystalline. Amorphous Se provides electrochemical cycling stability, due to inhibition of polyselenide formation and first cycle sodiation-induced pulverization. The carbon nanosheets themselves are also fully X-ray amorphous, containing minimal graphitic ordering. This prevents intercalation of Na into the carbon matrix, which would also lead to cycling-induced electrode disintegration. The mass loading of Se is 53%, which is among the highest reported, being second only to the 54% reported in C Luo et al. (2015).

The carbon nanosheets according the present invention may be implemented in various energy storage devices. The energy storage devices may include, for example, batteries and capacitors such as sodium ion batteries and capacitors, lithium ion batteries and capacitors, and ultracapacitors (e.g., supercapacitors, electrochemical capacitors), and hybrid ion capacitors. The energy storage device may have various form factors including, but not limited to, a D-cell battery, a pouch cell, a rectangular automotive starter battery scale cell, a C-cell sized battery, an AA-cell sized battery, an AAA-cell sized battery, a 18650 lithium ion battery, or a 26650 lithium ion battery.

The carbon nanosheets may be used in the anode, the cathode, or both. They may be in the primary phase or a secondary phase added to improve conductivity, rheology, heat transfer, stress buffering, etc. In some embodiments, the carbon nanosheets may server as standalone materials or may be used as a support or host for other active or inactive materials (as described above) in either the anode or the cathode.

One example of the present invention is illustrated in FIG. 1. FIG. 1 is a schematic illustration of an Se-CCN structure according to the present invention (left), its operation in a cathode versus a pseudographitic carbon (PGC) anode in a full sodium ion battery (center), and the voltage vs. capacity behavior of both electrodes (right).

Such a sodium-selenium battery full cell, pairing selenium in a carbon nanosheet cathode with a pseudographitic carbon anode (which provides a good low voltage plateau, akin to graphite with Li) was found to deliver remarkable Ragone chart characteristics. For example, one embodiment was found to yield energy-power values of 203 and 50 W h kg$^{-1}$ at 70 and 14 000 W kg$^{-1}$, as normalized by the active mass. In the exemplary embodiment, the microstructure of the cathode consists of Se primarily impregnated into the micropores of cellulose-derived carbon nanosheets. The elastically compliant two-dimensional carbon supports 53 wt % Se mass loading, resulting in an electrode with a high electrical conductivity, rapid Na/Li ion transfer, and structural stability during extended cycling. Due to the stable immobilization of the selenium phase and greatly minimized chemical interaction between selenium and the organic carbonates in the electrolyte, the shuttle effect of the polyselenide intermediates is minimized.

While the exemplary embodiment employed selenium, embodiments of the present may use other active materials such as sulfur (S), metal sulfides, silicon (Si), tin (Sn), antimony (Sb), germanium (Ge), and/or compounds or alloys thereof. The active material may also be titanium oxide (TiO$_2$) and/or Li$_x$Ti$_y$O$_z$ compounds. The present invention is also not limited to sodium ion batteries and can likewise be implemented in lithium ion batteries.

For the experiments described herein, nanosheets were prepared from a slurry of cellulose nanocrystals at a concentration of 11.5 wt % solids. In a typical synthesis run, a slurry with a total of 1.5 g solids was used. Milli-Q water was added to increase the total volume to 50 mL. The slurry was further sonicated until a uniform suspension has formed. A volume of 3 mL of concentrated sulfuric acid was added into the suspension, which was further sonicated for an additional 10 min. Then the suspension was sealed in a 100 mL stainless steel autoclave and soaked at 180° C. for 24 h. The obtained solid was collected via filtration, washed with MQ-water and dried in an oven. The dark brown products were carbonized and activated at 800° C. for 1 h with the presence of an equal mass of potassium hydroxide under an argon flow. The remaining active reagent was washed away with 2 M HCl and MQ-water. The obtained carbons were thoroughly dried in a vacuum oven.

To prepare the candidate material for experimentation, selenium powder (Alfa Aesar, 99.999%) and the prepared carbons were thoroughly mixed using a planetary ball milling method for 0.5 h in a mass ratio of 3:1 under an argon atmosphere. Selenium was impregnated into the carbon nanosheets in two separate steps. The first step was a selenium diffusion process which is conducted at 260° C. for 12 h. Before the second step, the obtained powder was sealed in a small volume glass tube inside an argon filled glovebox. In the second step, the glass tube containing a black powder was further soaked at 600° C. for 3 h under an inert atmosphere. The obtained black product (named Se-CCN) was then employed as the active material without further processing.

A baseline material was prepared via 30 min of manually mixing the selenium power with active carbon (NORIT A SUPRA) using a mortar and pestle (referred to herein as the "Se/C mixture"). Pristine selenium powder, referred to herein as "Se," was also used in some of the baseline analyses.

FIG. 2A shows a scanning electron microscopy (SEM) image of Se-CCN according to an embodiment of the present invention. The material displays a macroscopically open architecture of large carbon sheets arranged in three-dimensions. The surface of the materials is quite smooth, without individual selenium particles being detectable. FIG. 2B gives an energy-dispersive X-ray (EDX) Se map of the region shown in FIG. 2A. A comparison of the SEM micrograph and EDX map shows that there are no isolated islands of Se on the CCN surface and that its distribution is quite uniform. FIG. 2D shows a field emission (FE) TEM bright field micrograph of another region in the Se-CCN material. There is no detectable evidence of "stray" Se particles/islands/crystallites attached on or near the CCN surfaces. The TEM EDX maps of Se and C, shown in FIGS.

2E and 2F, indicate uniform loading of Se throughout the carbon matrix. According to both EDX and XPS analysis, the only detectable impurity in Se-CCN is oxygen. As demonstrated by the BET results (FIG. 3), Se fills the micropores in the CCNs, eliminating the vast majority of nitrogen access to their inner structure. The uniform Se distribution is due, at least in part, to the sheet-like morphology and sub 100 nm thickness (estimated from edge-on sections) of the CCN matrix. During synthesis, the nanoporosity is sufficiently shallow as to permit impregnation of molten Se within a reasonable time frame. Such an intimate Se—carbon architecture results in excellent electrode stability and rate performance. If any Se remains present outside the pores, it is uniformly wetted on the CCN surface, while being mechanically/chemically anchored at the numerous nanopore-surface terminations. It is expected that nanopore-anchored Se would be likewise electrochemically stable and quick to sodiate/desodiate. Overall, however, the terminal high temperature heat treatment should eliminate most of the non-impregnated Se phase from the microstructure.

Figure 3A:
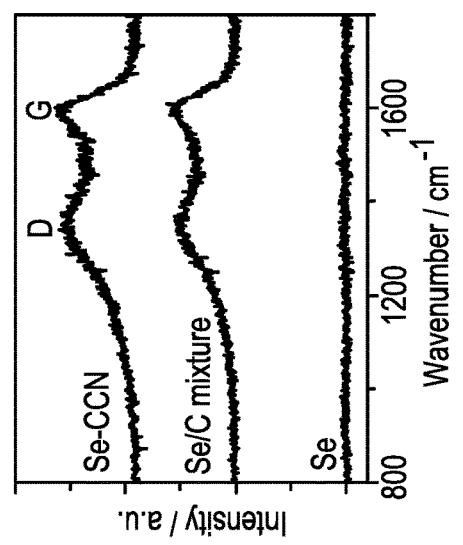
FIGS. 3A-3F show an analysis of the Se-cellulose derived carbon nanosheet (Se-CCN) according to the present invention and of a baseline Se/C mixture and Se powder, including indexed XRD spectra in FIG. 3A, Raman spectra in the range for the Se helix and ring in FIG. 3B, Raman spectra in the range for the carbon G and D bands in FIG. 3C, high resolution XPS spectra of Se 3d for Se-CCN and the Se/C mixture in FIG. 3D, nitrogen adsorption-desorption isotherms of Se-CCN and of the as-synthesized but not Se impregnated CCN in in FIG. 3E, and corresponding pore size distributions, as calculated using the density functional theory (DFT) in FIG. 3F.
Figure 7:
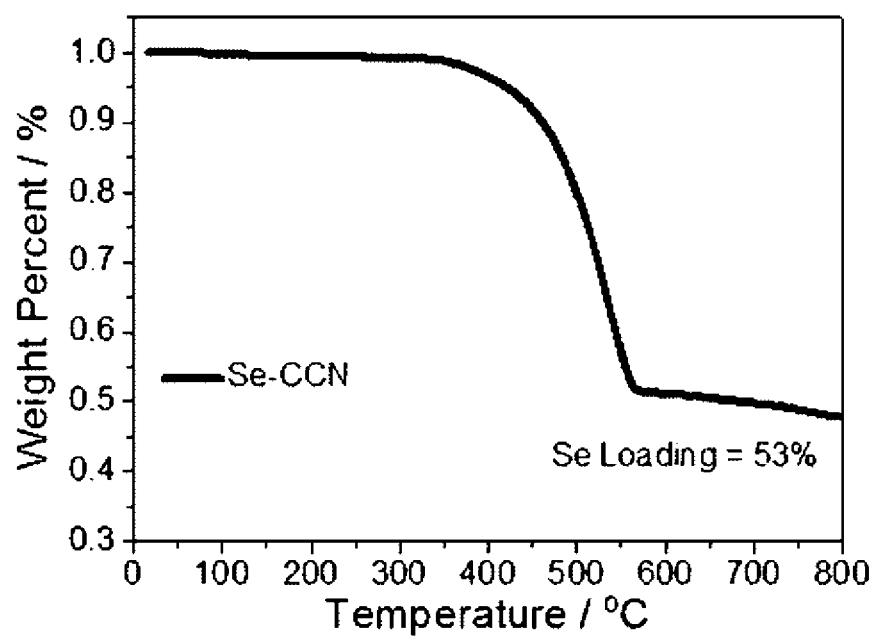
FIG. 7 is a TGA curve of the Se-cellulose derived carbon nanosheet (Se-CCN) according to the present invention.

The microstructure of the Se-CCN materials was further analyzed using X-ray diffraction (XRD). The bottom of FIG. 3A shows the XRD pattern of the pristine selenium powders and the Se/C mixture employed as a baseline. In both cases the Se is highly crystalline with a well-defined sharp Bragg reflection indexed to the equilibrium hexagonal lattice (trigonal crystal system $P3_221$). Conversely, the Se in Se-CCN is X-ray amorphous, with the only observed reflection being the broad (002) and (100) reflections associated with the short-range ordering in the amorphous carbon matrix. The amorphous CCN carbon matrix is structurally different from the carbon nanosheets obtained from coconut shells, hemp fiber or peanut shells. The coconut-derived carbon is entirely composed of layered graphene planes, while carbon from hemp fiber and peanut shells consists of multilayer graphene separated by regions of disorder. This difference may be attributed to the higher content of lignin in coconut shells, hemp fiber and peanut shells, which promotes graphitic ordering at high temperatures. The amorphous structure of the CCN is highly useful for promoting enhanced cycling as it will not allow for Na intercalation at any voltage. This in turn prevents Na insertion-induced dilation, which may lead to pulverization of the carbon over extended cycling. As demonstrated by the TGA curve of Se-CCN, shown in FIG. 7, the mass loading of Se is 53 wt %. This mass loading is high enough that if crystalline Se were to be present in Se-CCN, its Bragg reflections would be distinct from the amorphous carbon signal in the X-ray pattern. However, since Se Bragg peaks are not discernible, it may be concluded that crystalline Se is absent from the composite. This agrees with previous Se-into carbon-host impregnation studies, where only an amorphous phase is detected once Se is fully penetrated into the pores.

Figure 3B:
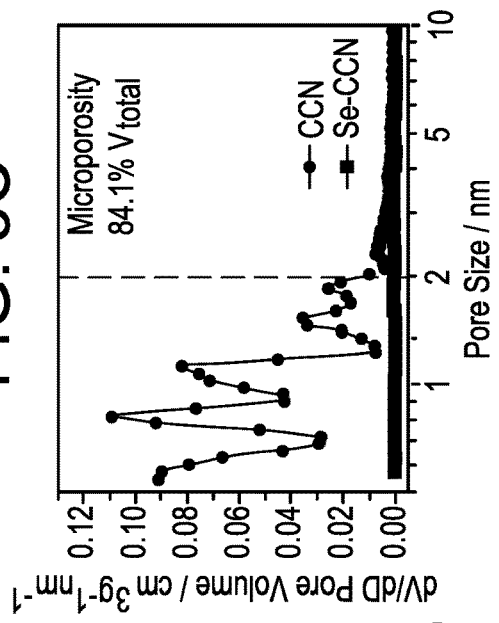
Figure 3D:
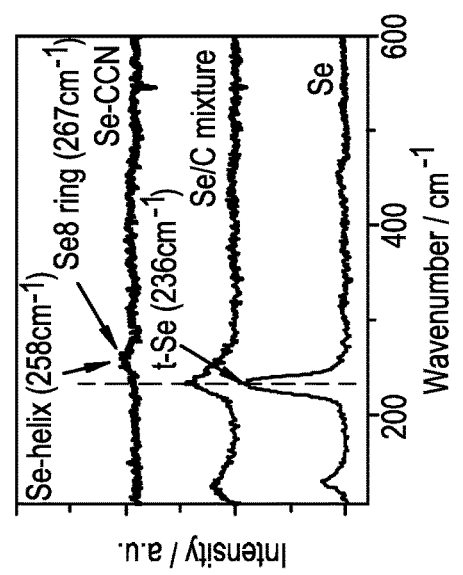
Figure 3C:
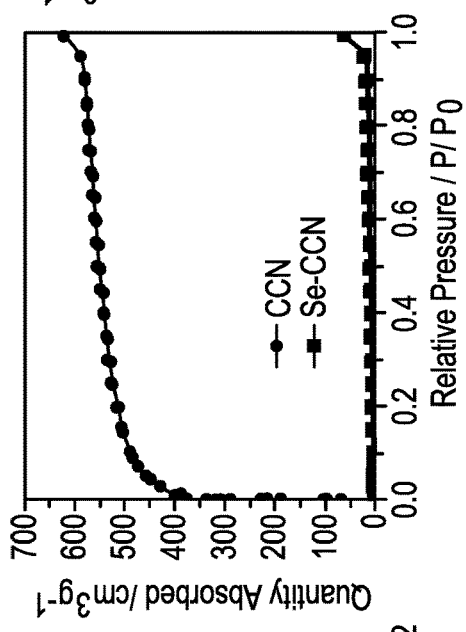
Figure 8A:
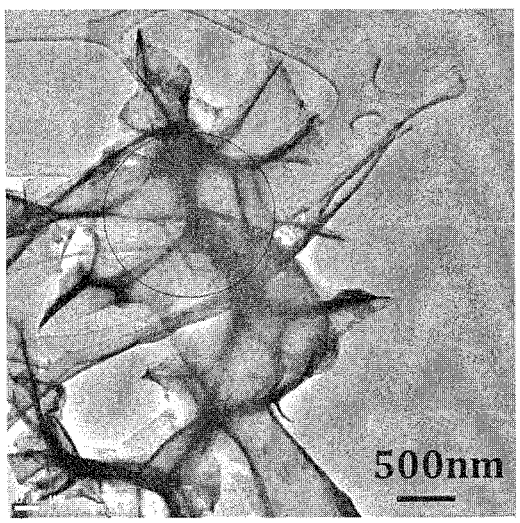
FIG. 8A shows bright field TEM micrograph of Se-CCN and FIG. 8B shows the associated selected area electron diffraction (SAED) pattern.
Figure 8B:
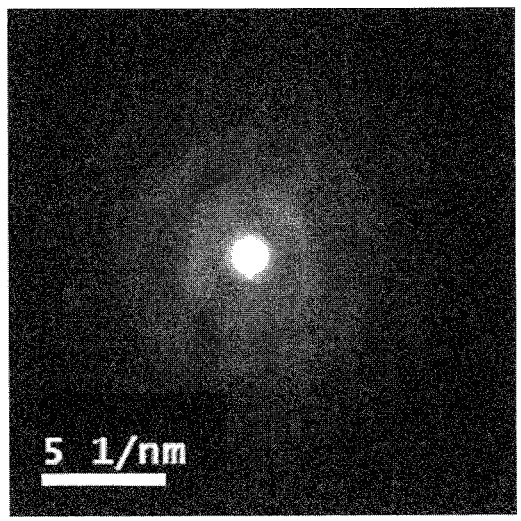

Raman spectroscopy was used to further investigate the structure of Se-CCN. As shown in FIG. 3B, pristine selenium powder exhibits a pronounced band at 236 $cm^{-1}$, which corresponds to trigonal Se. This main band is likewise observed for the Se/C specimen indicating that the Se structure is unchanged after physical mixing, in accordance with the XRD pattern. However, for Se-CCN, the trigonal Se band disappeared. Instead a weak broad band located around 260 $cm^{-1}$ is present. This band is attributed to the combination of the bond stretching modes of a Se single helix and a $Se_8$ ring, both being short-range structures. Thus these results of Raman spectroscopy indicate the existence of only short-range ordered selenium in Se-CCN, with no observable long-range order in the material, in accordance with the XRD results. Low-order Se is expected to be beneficial for electrochemical cycling stability, due to inhibition of the polyselenide formation that is known to be severe in crystalline Se and S electrodes against Li or Na. The two broad bands observed in Se-CCN at 1347 and 1592 $cm^{-1}$ are ascribed to the D- and G-bands of the amorphous CCN matrix (FIG. 3C). The intensity ratio of $I_G$ to $I_D$ is 0.80, confirming the highly disordered structure. FIG. 8A-8B shows a TEM selected area electron diffraction pattern (SAED) for the Se-CCN material. Due to the amorphous structure of both selenium and carbon, the pattern does not show any Bragg diffraction spots, displaying only an amorphous halo associated with short-range near neighbor positions in both materials.

Figure 9:
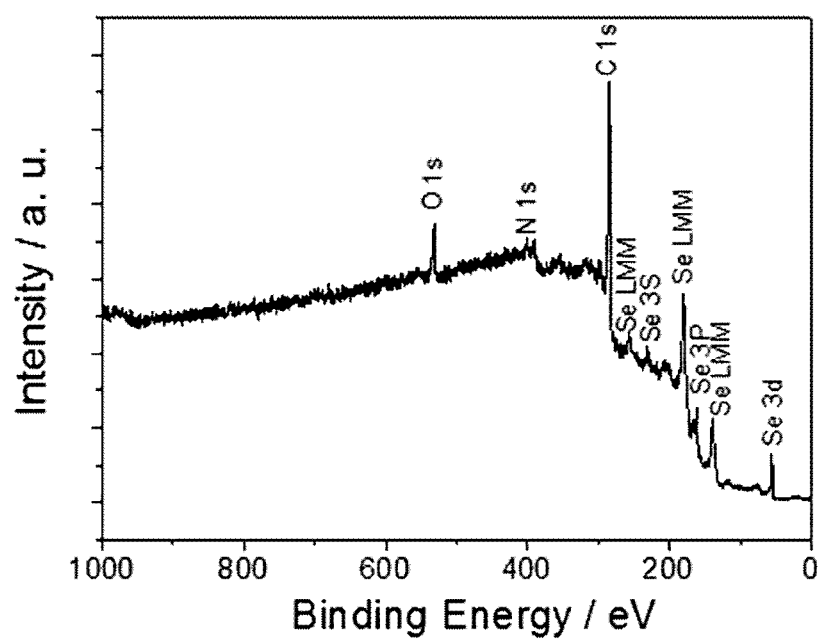
FIG. 9 is XPS spectrum of Se-CCN.
Figure 10:
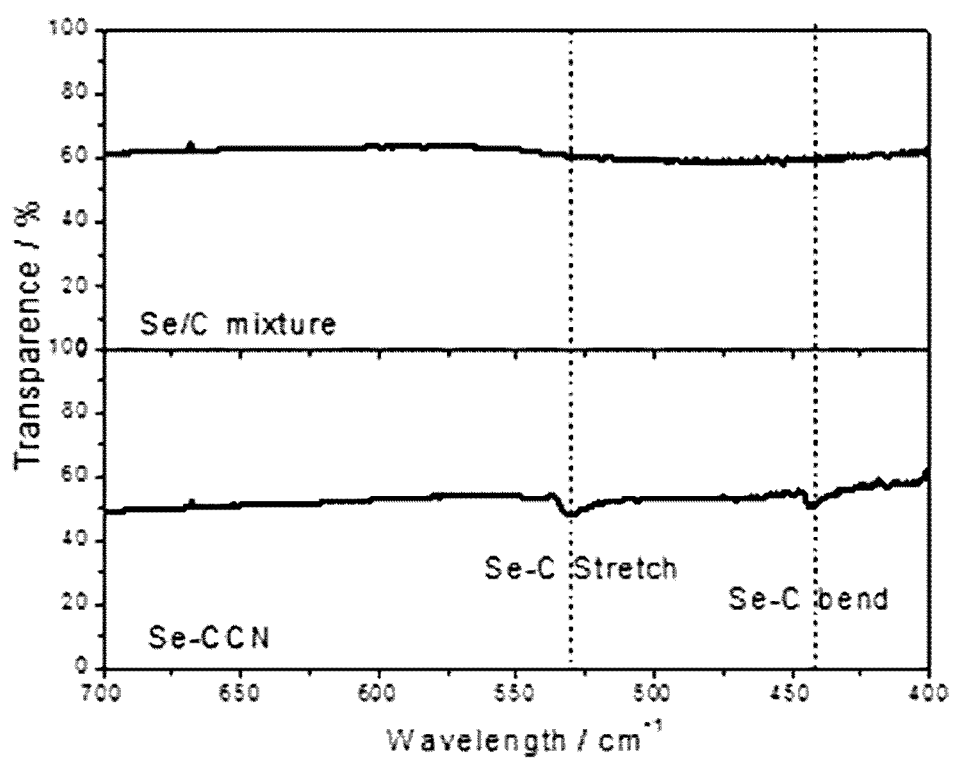
FIG. 10 is FT-IR spectra for Se-CCN and Se/C mixture.
Figure 11:
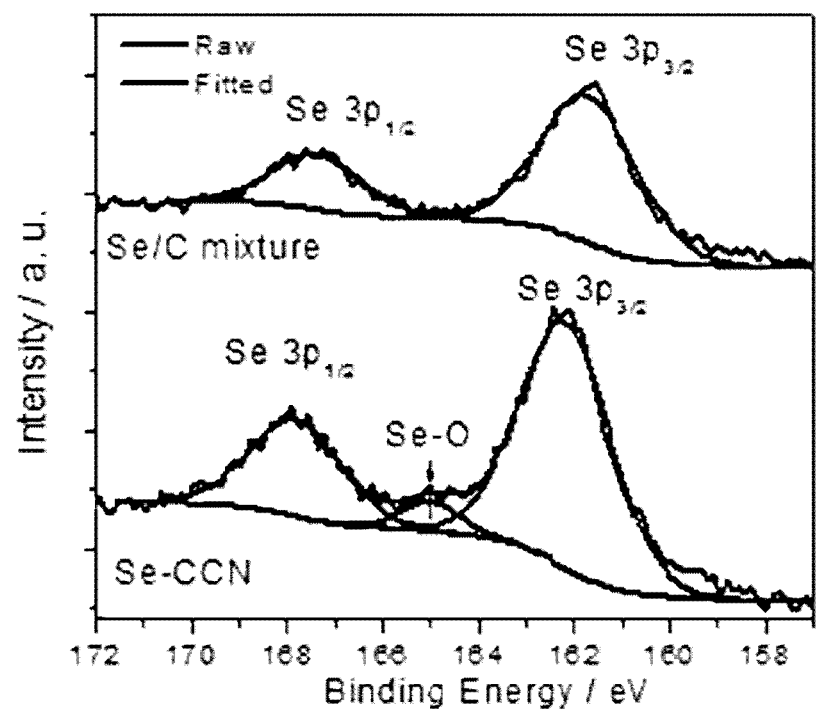
FIG. 11 is high resolution XPS spectra of Se 3p for Se-CCN and Se/C mixture.

High resolution X-ray photoelectron spectroscopy (XPS) was utilized to investigate the chemical state of Se. According to the XPS survey spectrum, O is detectable in Se-CCN at the level of 6.3 wt % (FIG. 9). As shown in FIG. 3D, the standard binding energy of elemental Se is 55.3 and 56.2 eV for Se $3d_{5/2}$ and Se $3d_{3/2}$ respectively, which are also the values for the Se/C specimen. For the Se-CCN specimen, however, a shift of B0.6 eV towards a higher binding energy is observed for both peaks. This shift is caused by the electron cloud density change of Se and indicates that the selenium atoms contacting CCNs have formed some chemical bonds with it. The bonding between the selenium and the carbon matrix in Se-CCN is further supported by the Se—C stretch and bend characteristic peaks observed in the FTIR spectrum. For the Se/C mixture, these peaks were absent. Both plots are displayed in FIG. 10). A degree of Se—O bonding was also observed in the Se 3p XPS spectrum (FIG. 11).

Figure 3E:
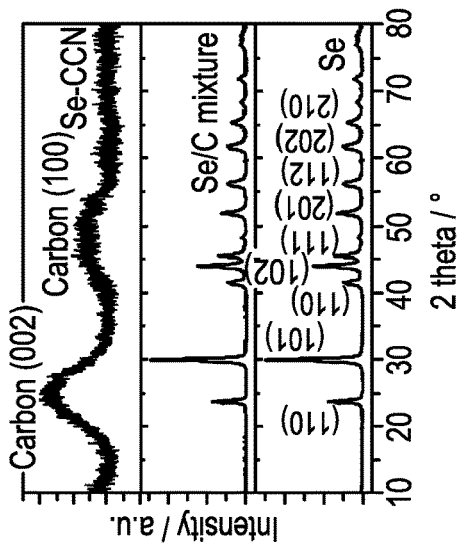
Figure 3F:
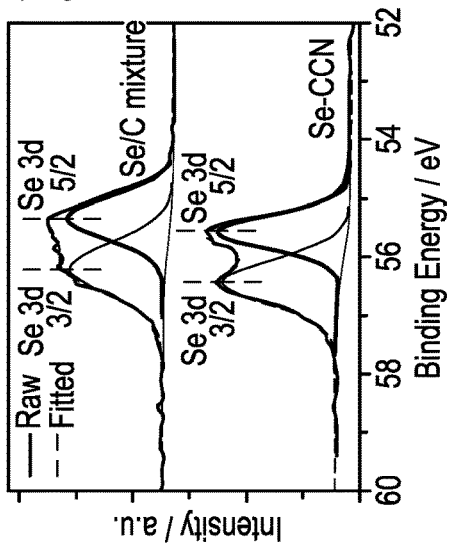

FIG. 3E shows the nitrogen adsorption-desorption isotherms of the bare as-synthesized CCNs and of Se-CCN. FIG. 3F shows their resultant pore size distributions, obtained using the density functional theory (DFT). The adsorption curve of the CCNs display type I isotherms, associated with microporous materials. The calculated BET surface area is 1610 $m^2\ g^{-1}$ and the total pore volume is 1.01 $cm^3\ g^{-1}$. This high surface area and large pore volume resulted from the known role of KOH as a highly efficient chemical activation agent when combined with a pre-hydrothermal treatment. As shown in FIG. 3F, the porosity in bare CCNs is heavily concentrated in the micropore region, i.e., pore sizes less than 2 nm. Based on the pore size distribution analysis, it is calculated that the volume of microporosity (<2 nm) is 84.1% of the total pore volume. The microporous structure of the CCNs is fundamentally different from the highly mesoporous structure of the carbon nanosheets derived from hemp or from peanut shells, and may be attributed to differences both in the structure of the precursor and in the details of the activation process.

After Se impregnation, the surface area dropped significantly, being only 87 $m^2\ g^{-1}$ in Se-CCN. This is effectively the geometric surface area of the impregnated carbon nanosheets, as there is negligible porosity available for $N_2$ adsorption. In turn this indicates that the available pore surface terminations in the CCNs are plugged by the selenium phase. Further, calculations indicate that there is plenty of pore volume in the CCNs to incorporate the Se phase: the pore volume of the CCNs is 1 $cm^3\ g^{-1}$. The density of amorphous Se is 4.28 $g\ cm^{-3}$. One gram of CCN will have 1 $cm^3$ of pore volume, which hosts 4.28 g of Se. This means that, at 53 wt % Se, the pores are roughly % filled.

As noted above, the carbon materials according to the present invention may be used in cathodes, anodes, or both.

In one exemplary embodiment, an Se-CCN cathode and sodium metal anode was prepared in a half-cell configuration and the electrochemical performance was investigated. A practical organic carbonate (i.e., EC, DMC) based electrolyte was used without any additives. Cyclic voltammetry (CV) and galvanostatic discharge/charge cycling was performed for the Se-CCN cathode. The electrodes were tested between 0.5-3 V vs. Na/Na+.

Figure 4C:
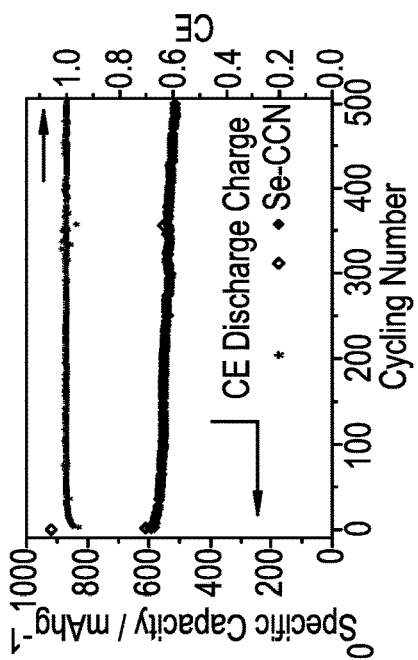
FIGS. 4A-4F show electrochemical performance of the Se-CCN used as a cathode versus Na/Na+, including cyclic voltammograms (CVs) in FIG. 4A, galvanostatic discharge/charge profiles tested at 0.2C in FIG. 4B, cyclability at 0.2C in FIG. 4C, rate performance in the 0.1C to 20C range in FIG. 4D, changes in the shape of discharge/charge profiles at different C rates in FIG. 4E, and a Ragone plot of various cathodes against Na or Li metal in FIG. 4F.
Figure 4F:
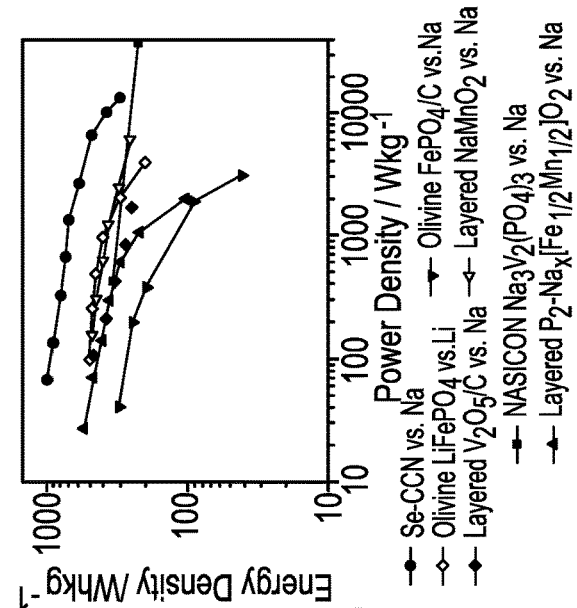
Figure 4B:
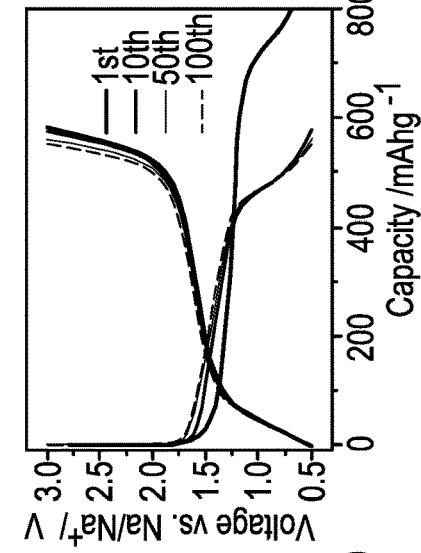
Figure 4E:
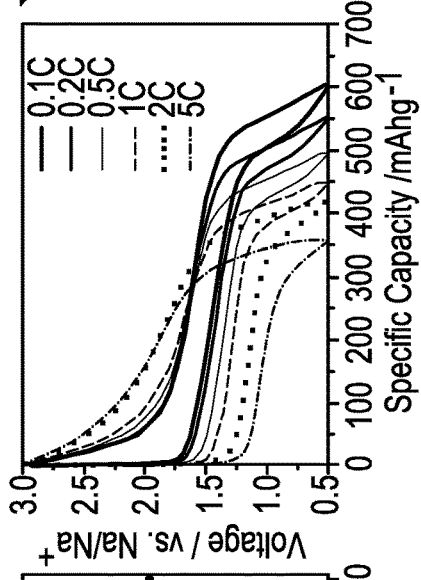
Figure 4A:
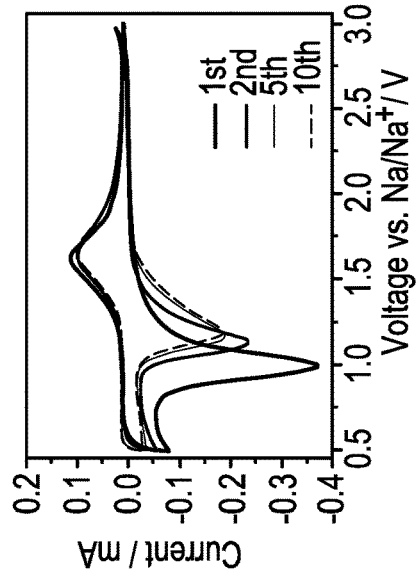

FIG. 4A shows the CV curves of the Se-CCN cathode at a scan rate of 0.1 mV $5^{-1}$. In the first scan cycle, there is a pair of cathodic and anodic peaks located at 1.00 and 1.62 V, respectively. The peaks on the CV represent the redox reaction between selenium and sodium. These two peaks shifted towards a higher voltage in the following cycles, more significantly for the cathodic peak. They shifted to 1.17 and 1.66 V from the 5th cycle and stabilized thereafter. The voltage shifts may be attributed to a change in the overpotential after several cycles associated with sodiating Se in a confining but elastically giving carbon matrix. A single redox peak pair feature indicates that the electrode undergoes a direct phase change between selenium and $Na_2Se$ without the formation of soluble sodium polyselenide $Na_2Se_n$ (n>=4).

A direct reaction sequence is promoted by the Se-CCN structure, i.e., amorphous selenium incorporated into the nanopores. Low order Se is known to be less liable to form intermediates with Na and Li than their crystalline allotropes. Reversible side reactions involving the shuttle of soluble polyselenides will lead to cycling-induced capacity loss as progressively more Se gets consumed. Since Se-CCN half-cell cycling capacity is quite stable over 500 cycles (88% retention), the shuttle effect is minimized. Over extended cycling there are also minimal irreversible electrochemical side reactions, e.g., solid electrolyte interface (SEI) formation on the Se-CCN surface. Irreversible electrochemical parasitic reactions will result in poor Coulombic efficiency (CE). In Se-CCN, the CE increased from 99% at the 10th cycle to 100%+/-0.5% in the subsequent cycles, confirming the stability of the initially formed SEI.

FIG. 4B shows the galvanostatic charge/discharge profiles of Se-CCN cathodes at a current density of 0.2C (10 equals to 678 mA $g^{-1}$ based on the mass of selenium). The voltage plateaus in the profile agree well with the peak positions in the CV curves. The cathode delivered an initial discharge capacity of 913 mA h $g^{-1}$ in the first cycle, with 583 mA h $g^{-1}$ being reversible. The cycle 1 irreversible capacity may be attributed to solid electrolyte interface (SEI) formation, as well as some irreversible trapping of Na within the carbon lattice at high potentials.

The reversible capacity of 583 mA h $g^{-1}$ is among the highest values reported for Se-based NIB cathodes. It indicates excellent utilization of selenium, which is due to its dense distribution primarily within the nanopores of the open carbon nanosheets. The profiles of the 10th, 50th and 100th cycles nearly overlap each other, showing that the activation process is complete by cycle 10. Although the plateau voltage of Se-CCN is lower (1.5 V, 613 $mAh^{g-1}$) than those of "traditional" Na ceramic cathodes such as layered $Na_{0.85}Li_{0.17}$—$Ni_{0.21}Mn_{0.64}O_2$ (3.4 V, ~185 $mAh^{g-1}$), bilayer $V_2O_5$ (3.0 V, ~250 $mAh^{g-1}$), olivine $FePO_4$ (2.5 V, ~65 $mAh^{g-1}$), and NASICONS (3.3 V, ~140 $mAh^{g-1}$), the reversible capacity is two and a half times higher or more.

Figure 12:
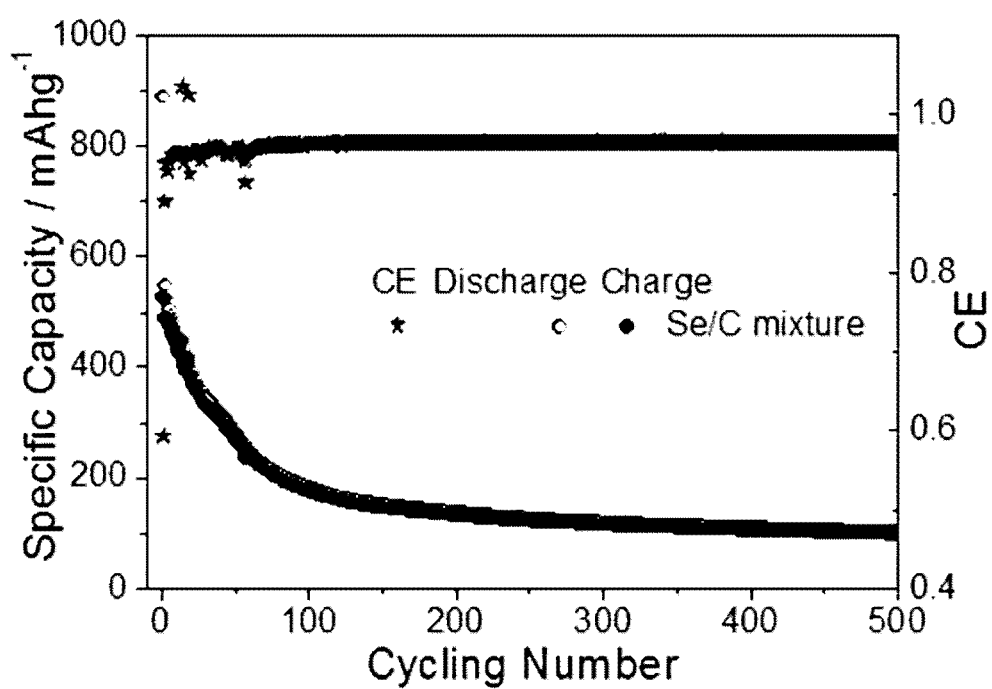
FIG. 12 shows cyclability of Se/C mixture in sodium half-cell at 0.2C.

The Se-CCN electrode was also tested for stability during extended cycling, employing a current density of 0.2C. As shown in FIG. 4C, the Se-CCN exhibited exceptional capacity retention: a reversible capacity of 514 $mAhg^{-1}$ is obtained after 500 deep cycles at 0.2C, which is equivalent to 88% capacity retention. The Coulombic efficiency (CE) increased from 99% at the 10th cycle to 100%+/-0.5% in the subsequent cycles. FIG. 12 displays the cycling results of the Se/C mixture specimen tested under the same conditions. The capacity decayed quickly upon cycling (35% retention after 100 cycles) and the CE was much lower, i.e. ca. 96%.

Figure 13A:
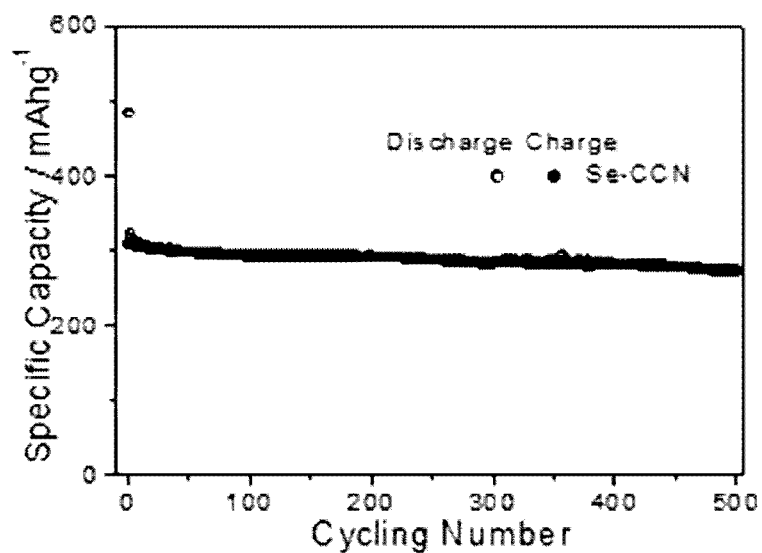
FIGS. 13A-13B show cycling capacity retention and rate capability values for Se-CCN based on the combined mass of the Se and of the CCN matrix, respectively.
Figure 13B:
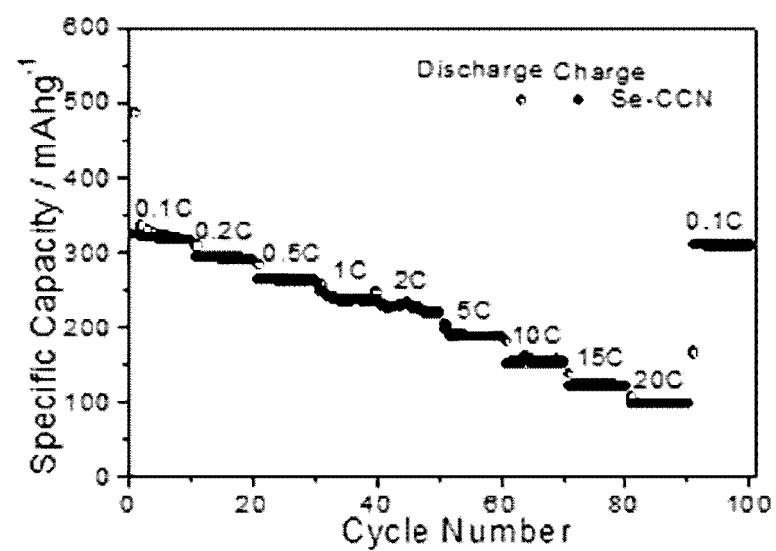

FIGS. 13A-13B show the cycling performance and the rate capability of the Se-CCN specimens when the capacity is normalized by the combined mass of Se and the CCN matrix. Since the mass loading of Se is 53%, these capacities are roughly one half of the data shown in FIG. 4. The CCN matrix is inactive at the relevant cathodic voltages, i.e. above 1 V, especially since Na access to the pores is blocked by the impregnated Se phase. It should also be pointed out that in all previous Se—carbon vs. Li/Li+ and Se—carbon vs. Na/Na+ studies, the reported capacity values are based on Se mass only.

Figure 14:
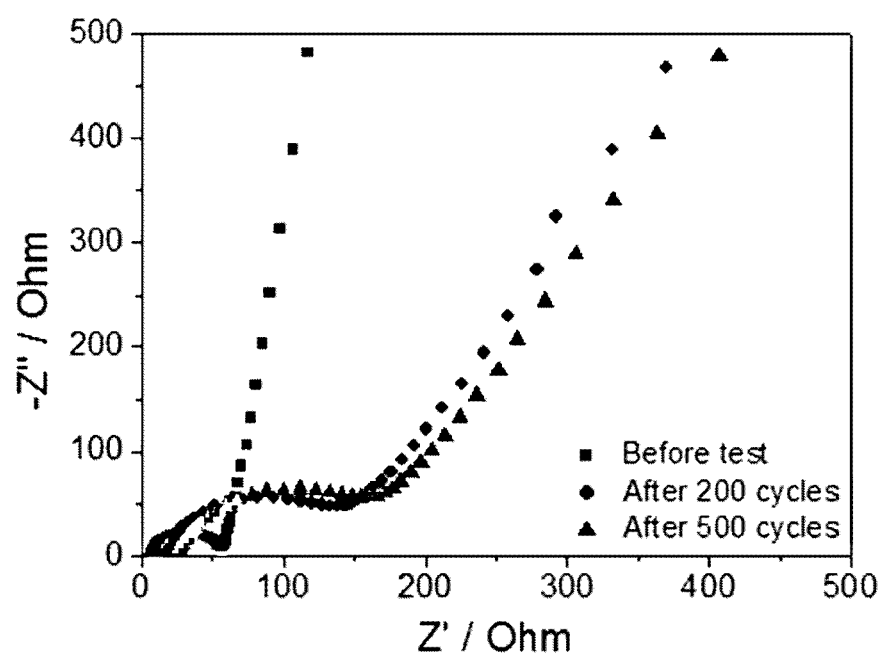
FIG. 14 shows Nyquist plots of Se-CCN cathodes in sodium cells before tests, after 200 cycles, and after 500 cycles.

FIG. 14 shows Nyquist plots of the Se-CCN half-cells prior to cycling, after 200 cycles and after 500 cycles. Table 1 below lists the electrochemical performance of state-of-the-art selenium based Na ion cathodes from the literature. Employing Se as a Na cathode is a relatively new concept and there are not numerous studies published on the subject. Se-CCN displays among the highest selenium loading and is by far the most cyclically stable.

| Material | Selenium content | Reversible specific capacity | Cyclability | Rate performance |
|---|---|---|---|---|
| Se-CCN | 53% | 613 $mAhg^{-1}$ at 67.8 $mAg^{-1}$ | 88% retention over 500 cycles | 355 $mAhg^{-1}$ at 3.4 $Ag^{-1}$ (5 C) 290 $mAhg^{-1}$ at 6.8 $Ag^{-1}$ (10 C) 184 $mAhg^{-1}$ at 13.6 $Ag^{-1}$ (20 C) |
| Carbon-selenium composites | 54% | ca. 595 $mAhg^{-1}$ at 50 $mAg^{-1}$ | 42.6% retention over 50 cycles | ca. 200 $mAhg^{-1}$ at 0.8 $Ag^{-1}$ ca. 130 $mAhg^{-1}$ at 1.2 $Ag^{-1}$ |
| Se@PAN derived carbon nanofibers | 52% | ca. 595 $mAhg^{-1}$ at 100 $mAg^{-1}$ | 87% retention over 80 cycles | 230 $mAhg^{-1}$ at 1 $Ag^{-1}$ |
| Se@mesoporous carbon | 30% | ca. 485 $mAhg^{-1}$ at 169.5 $mAg^{-1}$ | 70% retention over 380 cycles | ca. 265 $mAhg^{-1}$ at 2.04 $Ag^{-1}$(3 C) ca. 205 $mAhg^{-1}$ at 2.72 $Ag^{-1}$(4 C) ca. 168 $mAhg^{-1}$ at 3.4 $Ag^{-1}$(5 C) |
| Se@CNFs-CNT | 35% | 590 $mAhg^{-1}$ at 50 $mAg^{-1}$ | 98% retention over 80 cycles | 300 $mAhg^{-1}$ at 1 $Ag^{-1}$ |
| CPAN/Se Fibers | 36% | ca. 490 $mAhg^{-1}$ at 67.8 $mAg^{-1}$ | 81% retention over 300 cycles | ca. 310 $mAhg^{-1}$ at 1.36 $Ag^{-1}$ (2 C) 245 $mAhg^{-1}$ at 2.04 $Ag^{-1}$ (3 C) |

Resistance parameters were obtained by fitting the plots. The pristine cell has an equivalent series resistance ($R_{el}$) of 7.1Ω and a charge transfer resistance ($R_{ct}$) of 57.1Ω. After 200 cycles these values increased to 13.6Ω and 157.4Ω, respectively. Since the $R_{el}$ involves a combination of electrode and electrolyte impedances, its increase may be due to a range of factors, including changes at the Na counter electrode. The proportionally larger increase in the charge transfer resistance may be more straightforwardly attributed to SEI formation during cycling. After 500 cycles, the charge transfer resistance is minimally altered from the 300 cycle value, growing only by 7% to 168.3Ω. This indicates a highly stable SEI layer with prolonged cycling. With both Li and Na, SEI is known to be catalytically formed at every cycle on the fracture surfaces of active materials that are newly exposed to the electrolyte. It grows at much slower rates on the pre-existing SEI which is unperturbed. A stable $R_{ct}$ is indicative of an electrode structure that is stable during cycling and does not exfoliate, fracture, decrepitate, etc. thereby exposing unpassivated carbon and Se to the carbonates. The elastically forgiving CCN matrix will be responsible for such stability, buffering the inevitable volume expansion associated with the $2Na^++2e^-+Se)\rightarrow Na_2Se$ reaction within its pores.

Referring back to FIG. 1, this illustrates the origin of the enhanced stability and CE of Se-CCN. Crystalline Se is absent from the structure, minimizing polyselenide formation and the shuttle effect. The EC and DMC molecules have approximate diameters of 0.6 and 0.8 nm, with dynamic sizes under microthermal motion being larger. Therefore, it is expected that neither would be able to penetrate between the impregnated Se and the CCN matrix. The electrode is also structurally quite stable, with an open sheet-like morphology that is elastically forgiving both macroscopically and at the nm-scale of the pores.

Figure 4D:
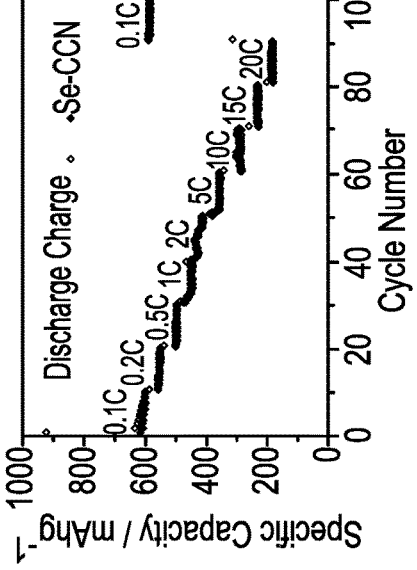

The rate capability of Se-CCN was also investigated against sodium. FIG. 4D shows the reversible capacities of the Se-CCN cathodes at current densities of 0.1C to 20C. Reversible capacities of 613, 447, 355, 290, and 184 mA h $g^{-1}$ are obtained at rates of 0.1C, 1C, 5C, 10C and 20C (i.e., 0.068, 0.68, 3.4, 6.8 and 13.6 A $g^{-1}$). A capacity of 613 mA h $g^{-1}$ is calculated to be 90.4% of the theoretical value for the Se to $Na_2Se$ conversion reaction. After the rate was reduced from 20C back to 0.1C, the capacity recovered to 587 mA h $g^{-1}$, indicating minimal high rate degradation. This rate performance is likewise leading the field as per Table 1. As displayed in FIG. 1, due to the sheet-like morphology of the carbon matrix, the Na ion solid-state diffusion distances needed to fully sodiate/desodiate the Se are nanometers in size. The open sheet-like morphology of Se-CCN also provides a large reaction surface allowing for facile charge transfer. According to Fick's first law, diffusion time is proportional to the diffusion distance squared. The time needed to fully sodiate/desodiate a 50 nm "deep" selenium phase inside a 100 nm CCN sheet would be 400 times less than if the selenium was similarly loaded into the pores of a 1 mm activated carbon particle.

FIG. 4E compares the voltage profiles of the Se-CCN electrodes at different C-rates. All the discharge/charge curves exhibit a pronounced plateau. The voltage hysteresis grows with higher C-rates, with the cathodic (sodiation) branch showing a proportionally larger hysteresis with increasing C. This may be ascribed to the origin of the sodiation overpotential, which may be primarily related to the stress associated with the volume expansion of Se inside the pores. At shorter charge times, i.e., higher C rates, there less diffusion permitted to relax this stress.

To elaborate the utility of the Se-CCN as a NIB cathode, a Ragone chart was generated for the half cell, i.e., for a Se—Na metal battery. These data are compared with some advanced NIB and LIB cathodes from the literature tested as half cells as well. The shown literature materials are diverse, being a range of ceramic cathodes, including the successfully commercialized $LiFePO_4$, layered P2 type compound $Na_{2/3}[Fe_{1/2}Mn_{1/2}]O_2$, layered transition-metal oxides $NaMnO_2$, olivine compound $FePO_4$, layered oxide $V_2O_5$, and NASICON $Na_3V_2(PO_4)_3$. The advantage of looking at the Ragone chart versus just the absolute reversible capacity of a cathode is that it also accounts for the differences in the operating voltage. This eliminates falsely perceived advantages of high capacity albeit low voltage materials. All cathodes plotted were tested as half-cells vs. Na metal or Li metal. As shown in FIG. 4F, the Se-CCN system is quite favorable, achieving 992 W h $kg^{-1}$ at 68 W $kg^{-1}$ and 384 W h $kg^{-1}$ at 10 144 W $kg^{-1}$ based on the active selenium mass. Even if the energy-power values were halved to account for the weight of the Na inactive carbon matrix, the Se-CCN electrode would still be among the best for both Na and Li.

Figure 15A:
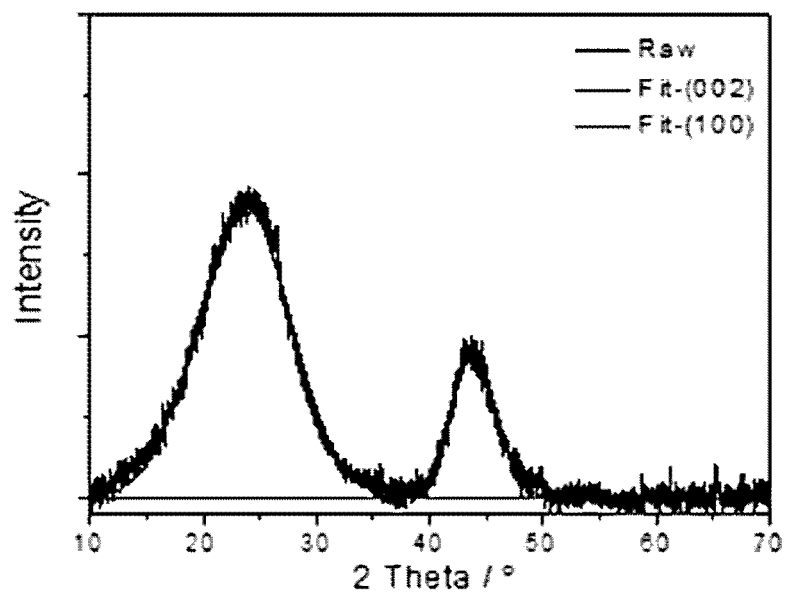
FIG. 15A is an XRD pattern of a pseudographitic carbon (PGC) employed as the anode in a full sodium ion battery according to an exemplary embodiment of the present invention.
Figure 15B:
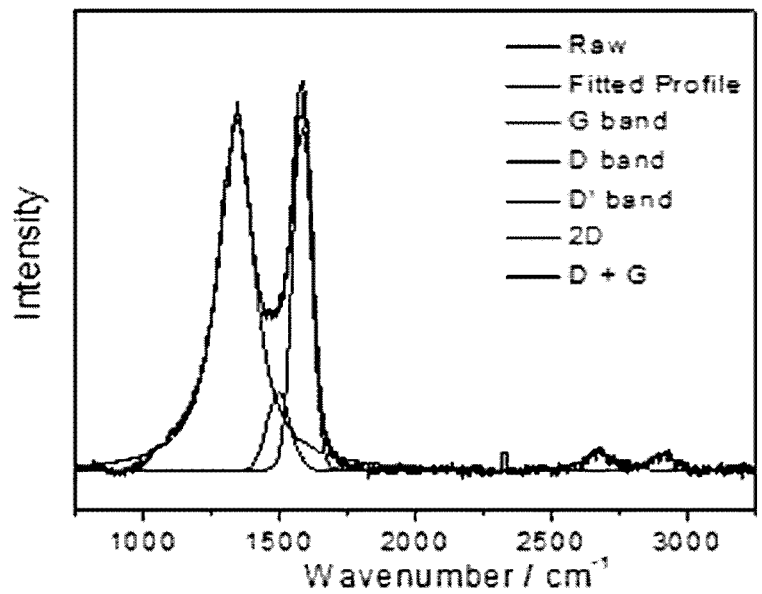
FIG. 15B is Raman spectrum of the pseudographitic carbon (PGC).

The Se-CCN may be used in both cathodes and anodes of a variety of energy storage devices. For example, Se-CCN is an ideal cathode for high energy sodium ion batteries when coupled with a proper anode. In an exemplary embodiment, a pseudographitic carbon (PGC) is used for the anode. PGC is composed of partially ordered domains of graphene, with an interlayer spacing substantially larger than that of graphite. The dilated intergraphene layer spacing allows for reversible Na intercalation/deintercalation at low voltages in conventional electrolyte solutions, which is impossible with graphite due to Na ion's size and electronic structure. FIG. 15A shows the XRD pattern of an as-synthesized PGC. In the XRD pattern, there are two discernible reflections that are ascribed to (002) and (100) of the ordered graphene domains within the carbon. However, the equilibrium reflections for graphite are distinctly absent. Based on the center position of the (002) reflection, the mean intergraphene layer spacing for PGC is 0.379 nm, versus the 0.335 nm spacing for equilibrium graphite. This 13% dilation allows for reversible Na intercalation between the graphene planes, qualitatively akin to Li with graphite. The Raman spectrum of PGC shown in FIG. 15B also demonstrates a degree of ordering in the structure, with a G-band to D-band intensity ratio of 0.98. This is distinct from a typical 0.33-0.4 IG/ID ratio for fully amorphous carbons that do not intercalate Na.

Figure 5A:
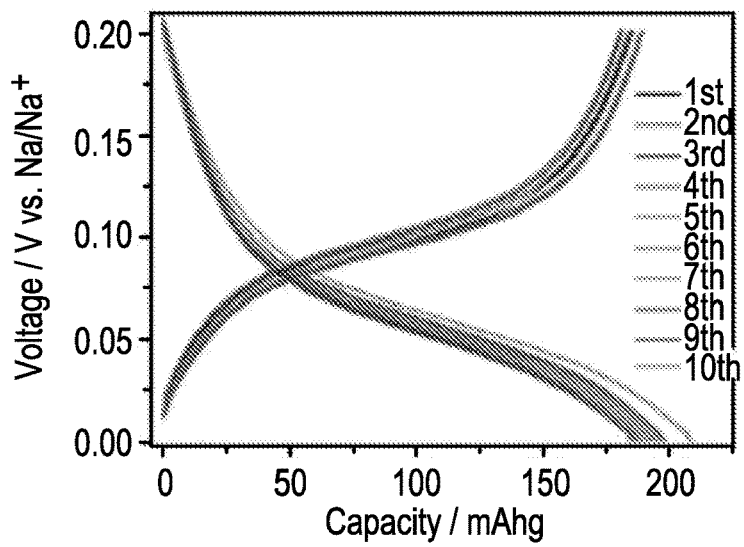
FIGS. 5A-5C show galvanostatic data of PGC, tested at 100 mA $g^{-1}$ within 0.001-0.2 V vs. Na/Na+ in FIG. 5A, Raman spectra of the PGC electrodes analyzed after being disassembled from their half-cells at different terminal sodiation voltages in FIG. 5B, and the calculated G-band to D-band ($I_G/I_D$) ratios indicating sodiation-induced ordering in the material in FIG. 5C.
Figure 16:
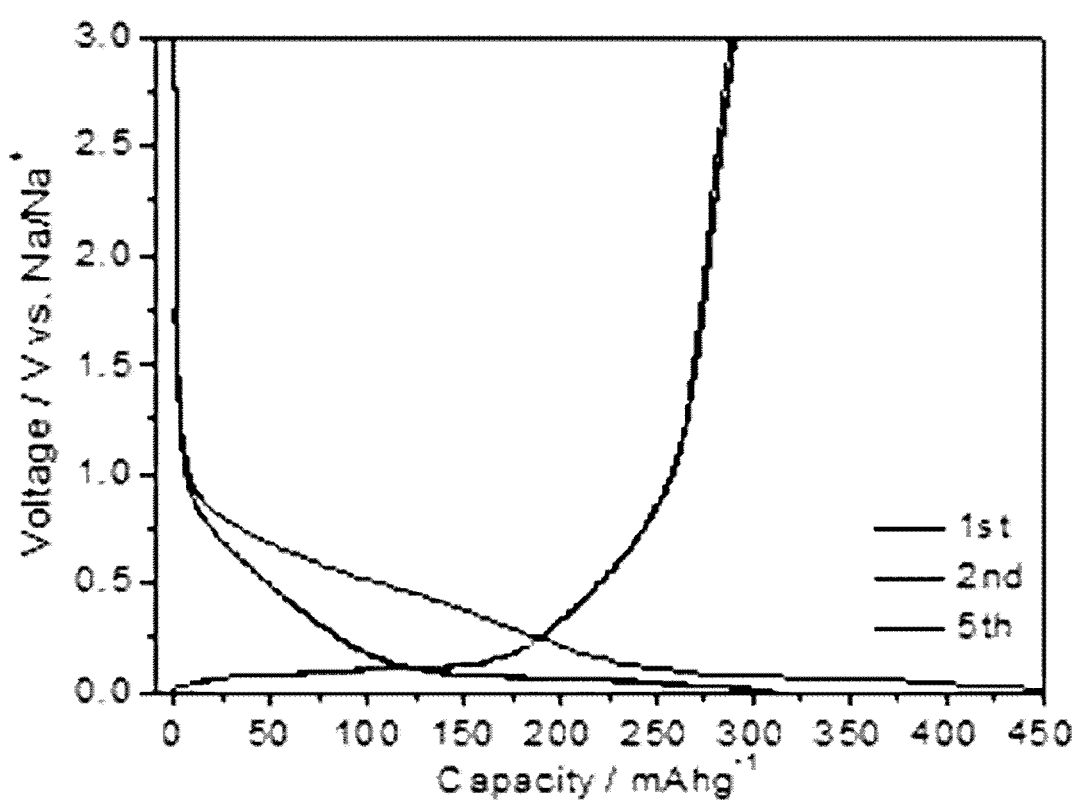
FIG. 16 show Galvanostatic charge/discharge profiles of the PGC anode within 0-3V vs. Na/Na+ at a current of 100 mAg$^{-1}$.
Figure 17A:
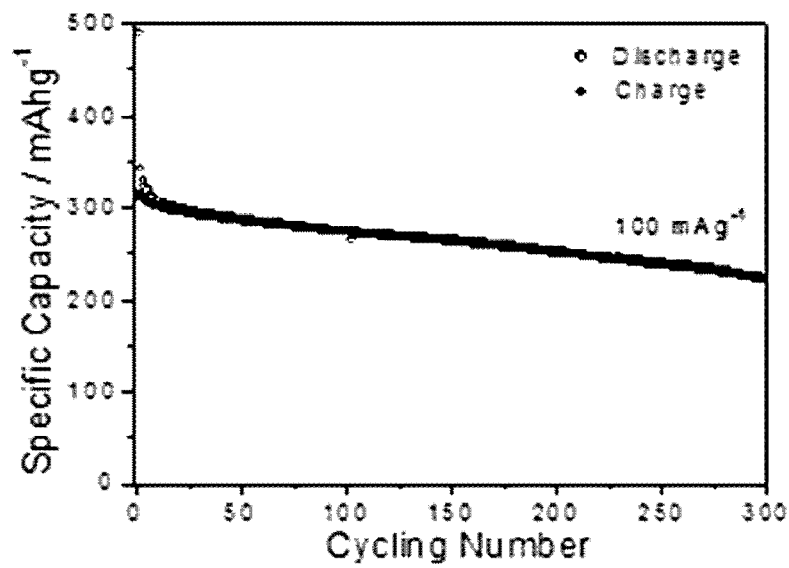
FIG. 17A shows cyclability of the PGC anode in a half cell at current density of 100 mAg–1.
Figure 17B:
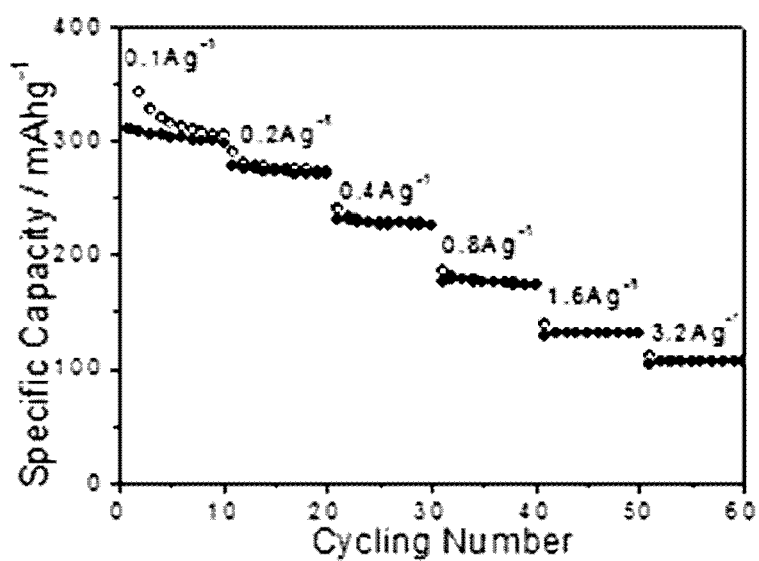
FIG. 17B shows rate performance of the PGC anode in the half cell.

FIG. 5A shows the galvanostatic charge-discharge characteristics of PGC tested between 0.001-0.2 V vs. Na/Na+. Within this narrow voltage window, the anode delivers 185-200 mA h $g^{-1}$ of reversible capacity when tested at 100 mA $g^{-1}$. At this current the total reversible capacity is B300 mA h $g^{-1}$, with a highly stable cyclability. After 300 charge-discharge cycles at 100 mA $g^{-1}$, 75% of the initial capacity is retained. At a current of 800 mA $g^{-1}$ the reversible capacity is 177 mA h $g^{-1}$, indicating good rate capability as well. Those results are shown in FIGS. 16 and 17A-17B. Between 0.001-0.2 V the electrode also displays a relatively flat voltage plateau and minor hysteresis. These features are qualitatively akin to Li in graphite. The PGC low voltage plateau is useful for full cell applications, as it results in the widest and most flat voltage window for the device.

Figure 5B:
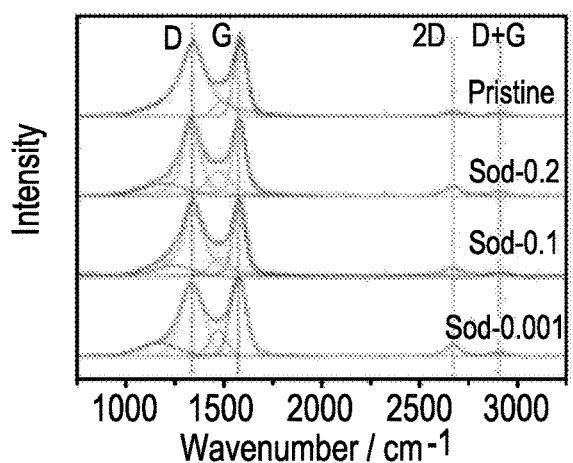
Figure 5C:
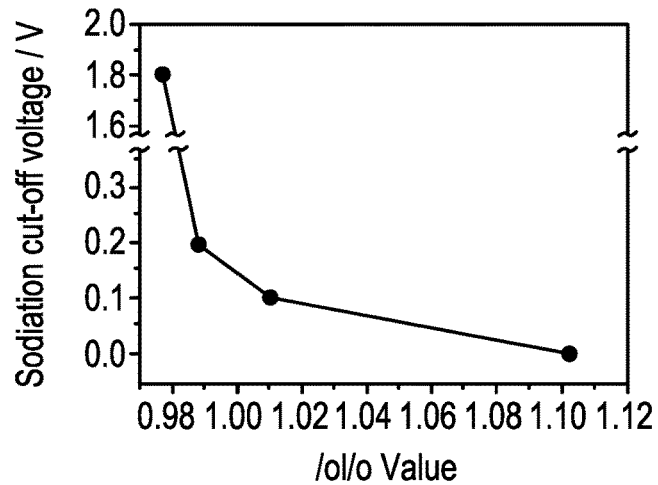
Figure 18A:
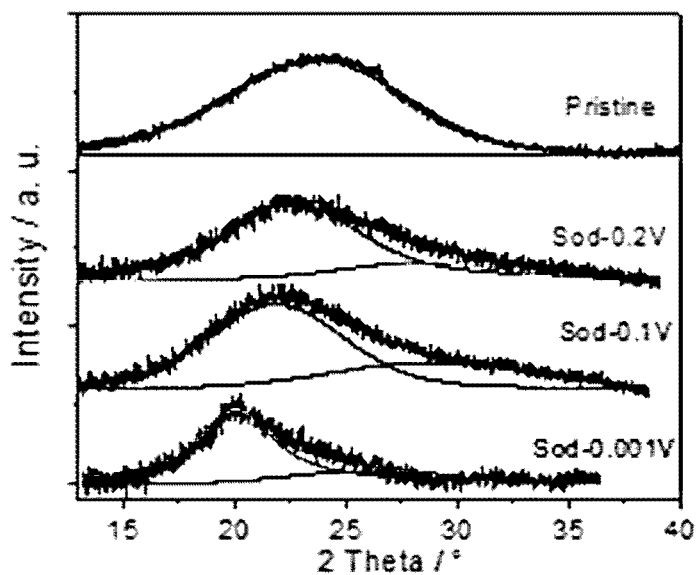
FIG. 18A shows XRD patterns of the PGC electrodes analyzed after being disassembled from their half cells at different terminal sodiation voltages.
Figure 18B:
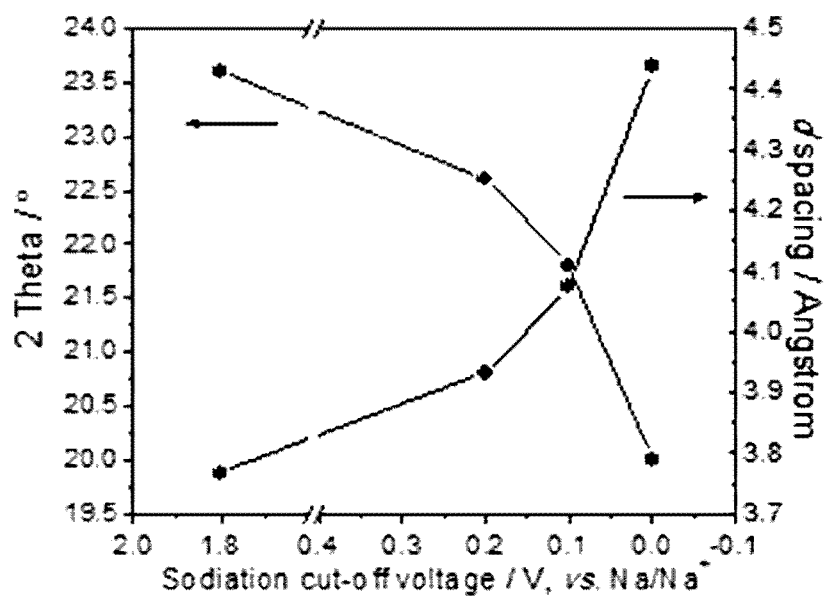
FIG. 18B shows the center position of (002) peak (left) and the corresponding calculated graphene interlayer spacing within the material (right).

For the following XRD and Raman analyses, the PGC electrodes were galvanostatically discharged to the target cut-off voltages at a current density of 50 mA $g^{-1}$. The electrodes were then collected from the disassembled coin cells, and thoroughly washed with DMC while inside the argon-filled glove box. In order to minimize the effects of air and moisture exposure, the cleaned electrodes were kept in the glovebox all the way up to the time of analysis. The samples were transferred using argon filled vials to the XRD/Raman equipment, where they were analyzed without further preparation. FIG. 18A shows the resultant XRD patterns of the PGC electrodes at different states of sodiation: pristine, sodiated to 0.2 V vs. Na/Na+, to 0.1 V vs. Na/Na+, and to 0.001 V vs. Na/Na+. It may be observed that with deeper sodiation the (002) peak shifts towards lower 2-theta values, the majority of the change occurring below 0.1 V. The change in the peak position and the corresponding calculated dilation of the intergraphene layer spacing are shown in FIG. 18B. This phenomenon is due to the intercalation of Na into the dilated graphene interlayers of PGC. The flat low voltage plateau in FIG. 5A is then due to the coexistence of a two phase region, although the Na staging reactions are not fully understood at the moment. FIG. 5B shows the Raman spectra of the PGC electrodes analyzed at the same cutoff voltages. The spectra are fitted and the values of IG/ID were plotted in FIG. 5C. As the sodiation proceeds, the IG/ID ratio increases and the second order 2D band became more prominent. Likewise, with XRD, the largest increase in the degree of order in the carbons occurs below 0.1 V.

Importantly, the XRD pattern shown in FIG. 18A shows no evidence of metallic Na plating into the pores of the carbon at any of the voltages. The most intense Na metal reflection would correspond to the {110} family, and would be located at 2-theta=29.31 in the pattern. Underpotential deposition into the nanopores is expected to occur close to the half-cell potential of the metal in that electrolyte, be it Na or Li. For the case of Li plating into the pores of hard carbons the phenomenon has been confirmed using analogous X-ray analysis. Thus if the Na pore filling mechanism was an important contributor to the total reversible capacity of PGC, the {110} Na XRD peak would show up below 0.2 V. As it is distinctly absent from the 0.2, 0.1 and 0.001 V vs. Na/Na+ diffraction patterns, we argue that Na metal pore filling is not important in pseudographitic systems. This is reasonable as pore filling and intercalation occur in approximately the same voltage regime, and thus may be expected to compete in terms of the net contribution to the overall capacity. In fact, the hard carbons that were tested against Li, which demonstrated minimal intercalation at low potentials, displayed highly prominent {110} Li peaks instead.

To introduce Na into the full cell, the individual electrodes were presodiated to set voltages. The Se-CCN cathode was presodiated to the cut-off voltage of 0.5 V vs. Na/Na$^+$. According to the charge/discharge profile of Se-CCN, this puts it in a nearly fully sodiated state. The PGC anode was only partially sodiated to 0.2 V, leaving the vast majority of the useful low voltage capacity untapped. Thus the sodiation states of the cathode and of the anode mimicked closely what is expected in a conventional battery: a sodiated (or lithiated) cathode and an anode with low voltage capacity that is uncharged. As indicated earlier, utilizing the low voltage plateau capacity of the anode maximized the voltage window and yielded a relatively flat profile in the full cell. Both electrodes were cycled twice prior to setting the target cut-off voltages, which was done to minimize the first cycle irreversible capacity loss in the full cell.

Figure 6A:
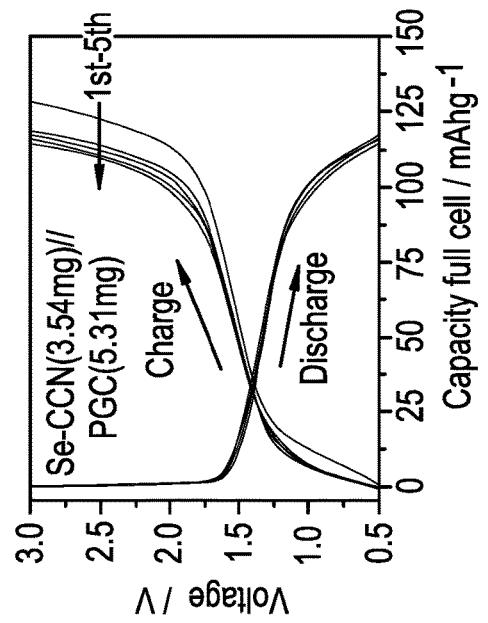
FIGS. 6A-6D show data concerning a full sodium cell coupling a Se-CCN cathode and a PGC anode, including half-cell charge/discharge profiles of Se-CCN (0.5-3 V vs. Na/Na+) and pseudographitic carbon PGC (0-0.2 V vs. Na/Na+) in FIG. 6A and electrochemical performance of the full sodium cell in FIGS. 6B-6D. The first five cycle galvanostatic profiles of the full cell are shown in FIG. 6B, rate capability, with both capacity and current density calculated according to the combined mass of the anode and cathode materials are shown in FIG. 6C, and Ragone plots of the Se-CCN//PGC full cell compared to state-of-the-art reported sodium full cells in the literature (circles represent organic asymmetric batteries, stars represent organic symmetric batteries, squares represent aqueous batteries) are shown in FIG. 6D. The energy and power densities were normalized to the total mass of the active materials.

FIG. 6A displays the 3rd and 4th half-cell charge/discharge voltage profiles for the Se-CCN cathode and PGC anode. The discharging profiles are also illustrated on the right column of FIG. 1. During battery discharge, Na+ deintercalates from the pseudographitic domains (i.e. $Na_xC$-$xNa+C$) in the anode and reacts with the Se to form $Na_2Se$. The PGC exhibits a pronounced flat plateau, with 196 mA h g$^{-1}$ of capacity within the voltage window of 0-0.2 V vs. Na/Na$^+$ at 100 mA On the cathode side, Se-CCN displays 300 mA h g$^{-1}$ of capacity between 0.5-3 V vs. Na/Na$^+$ when normalized by the total mass of the material. In a full cell, the respective mass of the anode and the cathode may be adjusted for capacity matching. Based on the half-cell specific capacity values, the mass ratio of the cathode to the anode in the battery was set to 2:3. The typical mass loading for the full cell electrodes is 2 mg cm$^{-2}$ for the Se-CCN cathode and 3 mg cm$^{-2}$ for the anode. With an area of 1.77 cm$^2$ for both electrodes, the absolute mass applied in the full cell is 3.54 mg and 5.31 mg for the cathode and anode, respectively. As shown in FIG. 16, the total reversible capability of PGC within a voltage window of 0-3 V is around 300 mA h g$^{-1}$. Thus in effect we employed a 50% percent oversized anode in the full cell. As the energy and power density calculations counted the total mass of both electrodes, the oversized anode was fully accounted for.

Figure 6B:
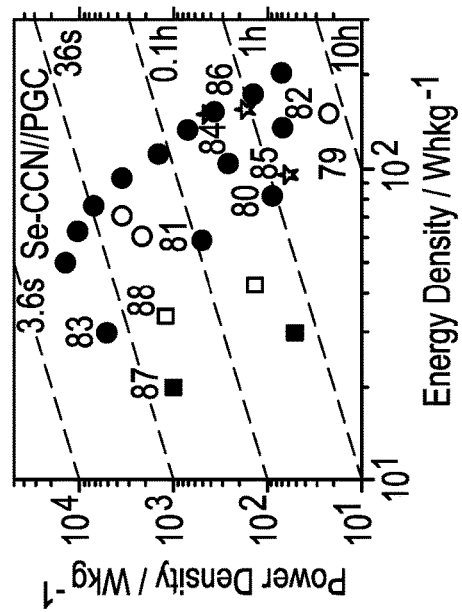
Figure 6C:
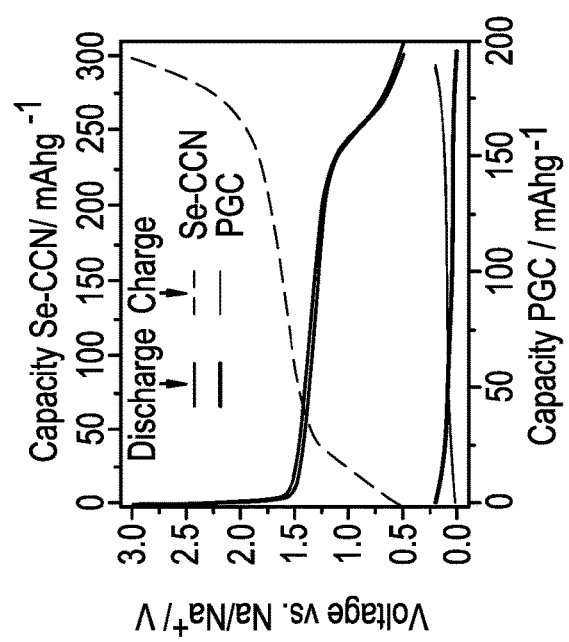

FIG. 6B shows the first five cycle discharge/charge profiles of the Se-CCN//PGC sodium full cell tested in a voltage window of 0.5-3 V. It can be seen that the plateaus display only a minor shift towards a lower voltage for the full cell as compared to the Se-CCN half cell. The full cell delivers a capacity of 117 mA h g$^{-1}$ at a current density of 40 mA g$^{-1}$. Based on the absolute mass of the electrodes (i.e., 8.85 mg in total), the absolute capacity of a typical full cell is 1.04 mA h. FIG. 6C shows the capacity obtained at various current densities. Since both electrodes offer fast kinetics, the battery delivers excellent capacity even at very high current densities, e.g., 4, 6, and 8 A g$^{-1}$. Such rate performance is quite exceptional for Na-based battery devices, which are normally relatively low in power. After the high rate tests, when the current is turned back to 40 mA g$^{-1}$, the capacity recovers to 101 mA h g$^{-1}$ (89% retention). After 150 cycles at various rates, the final battery cell capacity is still 89 mA h g$^{-1}$.

Figure 6D:
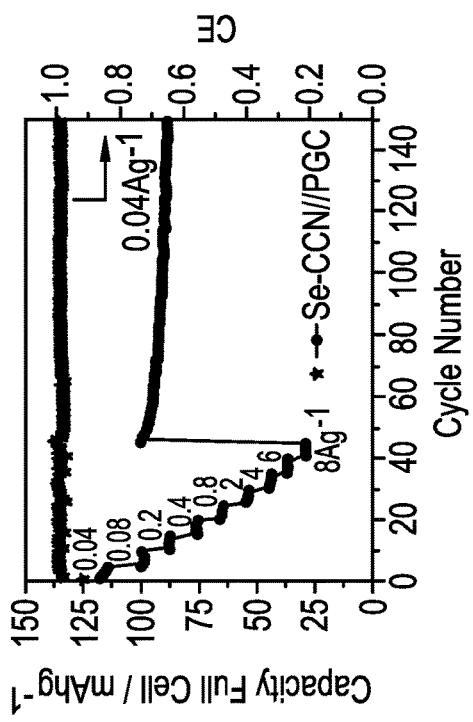

Advantages of the Se-CCN//PGC NIB according to the present invention is illustrated using a "global" Ragone chart shown in FIG. 6D, which compares the device to the state-of-the-art Na ion batteries reported in the literature. The energy-power values for Se-CCN//PGC were obtained based on the total mass of both electrodes. The systems plotted for comparison include configurations of P2-$Na_{2/3}Ni_{1/3}Mn_{2/3}O_2$/Sb nanorods, $Na_xNi_yMn_{1-y}[Fe(CN)_6]$//hard carbon, $Na_3V_2(PO_4)_3$—C//Sb@$TiO_{2-x}$, $Na_xFe[Fe(CN)_6]$//$FeO_x$-CNT, $Na_{0.7}CoO_2$//graphite, symmetric $Na_3V_2(PO_4)_3$-rGO-CNT//$Na_3V_2(PO_4)_3$-rGO-CNT, $Nao_{0.8}Ni_{0.4}Ti_{0.6}O_2$//$Na_{0.8}Ni_{0.4}Ti_{0.6}O_2$, $Na_3V_2(PO_4)_3$@C//$Na_3V_2(PO_4)_3$@C, aqueous NIBs with configurations of $NaMnO_2$//$NaTi_2(PO_4)_3$, and $Na_{1.94}Ni_{1.03}Fe(CN)_6$//$NaTi_2(PO_4)_3$. Table 2 below provides the critical electrochemical parameters of both the cathodes and full cells of these systems. Although the Se-CCN//PGC full cell exhibited a mid-range output voltage of ~1.5 V, the high specific capacity/rate capability of the Se-CCN cathode (~3-6 times of the other cathode capacities) still enabled the full device to display very competitive energy/power densities. Our sodium full cell has a specific energy density of 203 and 175 W h kg$^{-1}$ at power densities of 70 and 139 W kg$^{-1}$. Such energy-power values are favorable in the broader context of the existing Na ion systems.

| Full cell configuration (Cathode//Anode) | Cathode type | Cathode capacity (mAh g$^{-1}$) | Cell Voltage (V) | Energy density (Wh kg$^{-1}$) | Power density (W kg$^{-1}$) |
|---|---|---|---|---|---|
| Se-CCN//PGC | Selenium based cathode | 300 | ~1.5 | 203/64 | 70/10500 |

-continued

| Full cell configuration (Cathode//Anode) | Cathode type | Cathode capacity (mAh g$^{-1}$) | Cell Voltage (V) | Energy density (Wh kg$^{-1}$) | Power density (W kg$^{-1}$) |
|---|---|---|---|---|---|
| P2-Na$_{2/3}$Ni$_{1/3}$Mn$_{2/3}$O$_2$//Sb nanorods | P type layered TM oxide | 38 | 2.9 | 110/70 | 40/3000 |
| NaMnO$_2$//NaTi$_2$(PO$_4$)$_3$ | Tunnel-type TM oxides | 55 | ~1.2 | 30/20 | 50/1000 |
| Na$_{0.7}$CoCO$_2$//graphite | P type layered TM oxide | ~100 | 2.2 | 60/30 | 503/5030$^a$ |
| Na$_x$Fe[Fe(CN)$_6$]//FeO$_x$-CNT | Prussian blue analogue | ~120 | ~2 | 136 | 68 |
| Na$_3$V$_2$(PO$_4$)$_3$@C//Na$_3$V$_2$(PO$_4$)$_3$@C | NASICON | 104.3 | ~1.7 | 154.5 | 170$^a$ |
| Na$_3$V$_2$(PO$_4$)$_3$-rGO-CNT//Na$_3$V$_2$(PO$_4$)$_3$-rGO-CNT | NASICON | 115 | ~1.7 | ~150 | 425$^a$ |
| Na$_{1.94}$Ni$_{1.03}$Fe(CN)$_6$//NaTi$_2$(PO$_4$)$_3$ | Prussian blue analogue | 65 | ~1.27 | 42.5/34 | 130/1200 |
| Na$_{0.8}$Ni$_{0.4}$Ti$_{0.6}$O$_2$//Na$_{0.8}$Ni$_{0.4}$Ti$_{0.6}$O$_2$ | O type layered TM oxide | ~80 | 2.8 | 96 | 60 |
| Na$_3$V$_2$(PO$_4$)$_3$—C//Sb@TiO$_{2-x}$ | NASICON | 90 | 2.5 | 151/61 | 21/1830 |
| Na$_x$Ni$_y$Mn$_{1-y}$[Fe(CN)$_6$]//hard carbon | Prussian blue analogue | 62.2 | ~3$^a$ | 81.42 | 90 |

Figure 19A:
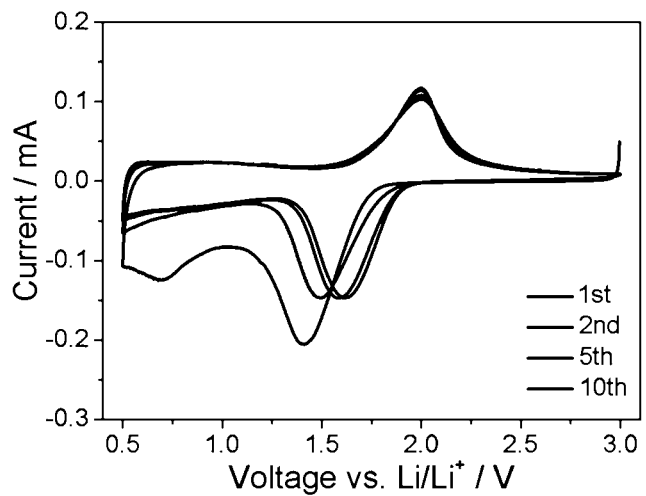
FIGS. 19A-19F show electrochemical performance of Se/NCC as a cathode in lithium half cells.
Figure 19B:
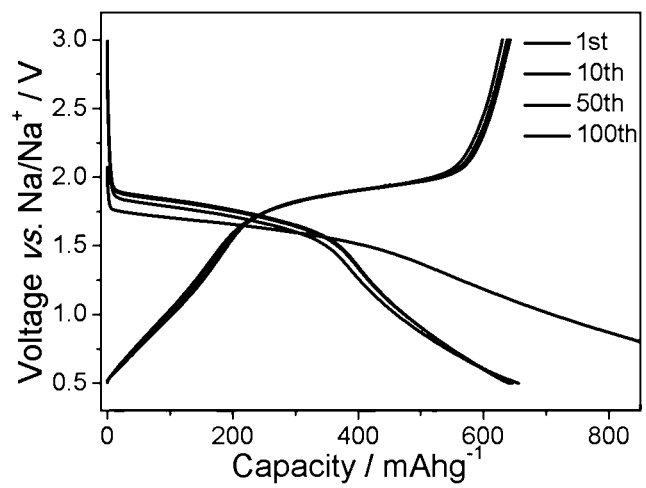
Figure 19C:
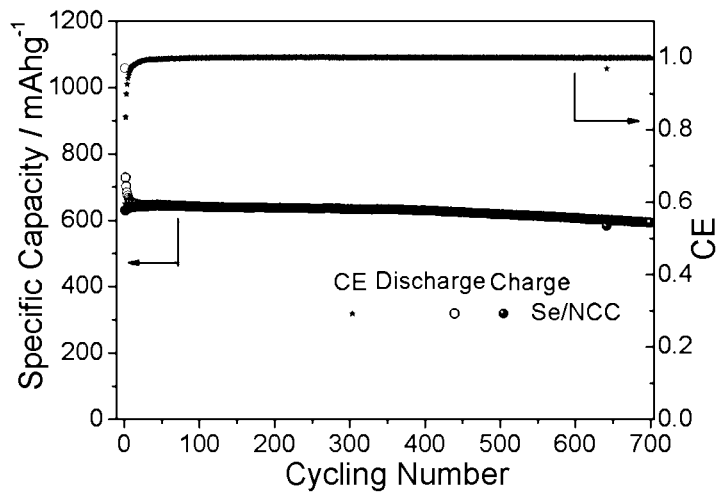
Figure 19D:
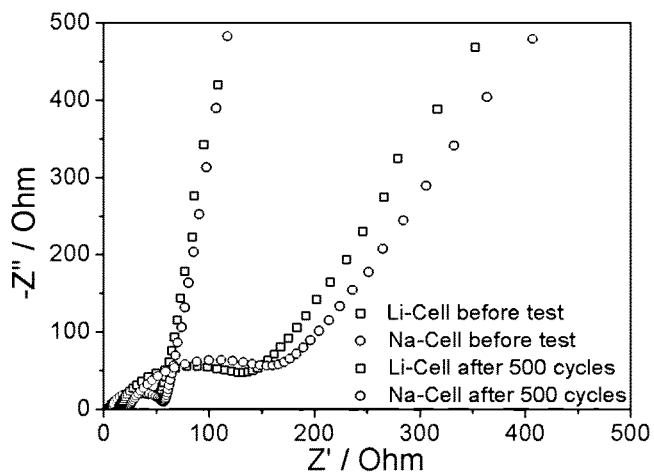
Figure 19E:
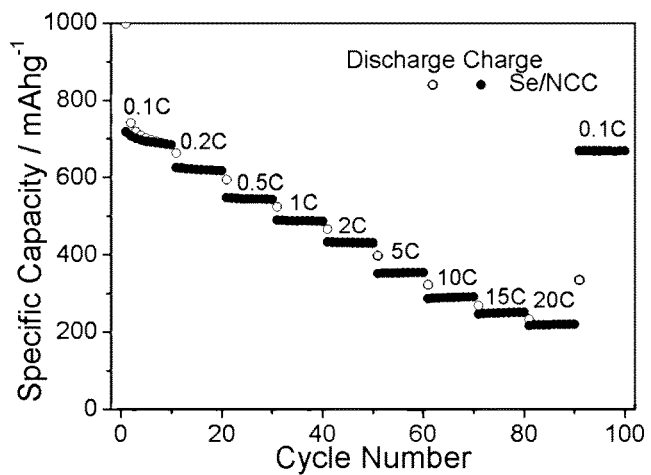
Figure 19F:
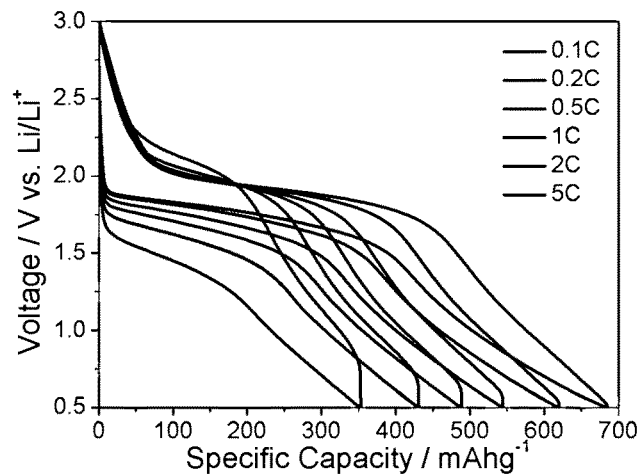

As noted above, the present invention is applicable to various different energy storage devices and is not limited to sodium ion batteries used in the experiments described above. In particular, the present invention has been evaluated in lithium half cells with favorable results. FIGS. 19A-19F show electrochemical performance of Se/NCC as cathode in lithium half cells. FIG. 19A shows cyclic voltammograms (CVs) of Se/NCC against lithium. FIG. 19B shows galvanostatic discharge/charge profiles of Se/NCC, tested at 0.2C. FIG. 19C shows cyclability of Se/NCC at 0.2C. FIG. 19D shows Nyquist plots of Se/NCC cathodes in Li and sodium cells before tests and after 500 cycles. FIG. 19E shows rate performance of Se/NCC with rates from 0.1 to 20C. FIG. 19F shows changes in the shape of discharge/charge profiles of Se/NCC cathodes at different C rates.

Although the invention has been described with reference to a particular arrangement of parts, features and the like, these are not intended to exhaust all possible arrangements or features, and indeed many modifications and variations will be ascertainable to those of skill in the art.

What is claimed is:

1. A carbon material, comprising:
    a carbon nanosheet derived from a biological precursor including a plurality of pores, wherein more than 50% of the pores are micropores, each micropore having a size of less than 2 nm; and
    an active material impregnated into at least a portion of the micropores of said carbon nanosheet, wherein the active material is:
        (a) selenium;
        (b) silicon (Si), tin (Sn), antimony (Sb), germanium (Ge), and/or compounds or alloys thereof;
        (c) titanium oxide (TiO$_2$); or
        (d) combinations thereof,
    wherein the carbon nanosheet is fully amorphous.

2. The carbon material according to claim 1, wherein the biological precursor is one of lignin, starch, crude fiber, hemicellulose, sugar, ash, amorphous cellulose, or pectin.

3. The carbon material according to claim 1, wherein the biological precursor is one of flax, hemp, jute, ramie, nettle, kenaf or cannabis.

4. The carbon material according to claim 1, wherein the biological precursor is a nanocrystalline cellulose.

5. The carbon material according to claim 4, wherein the active material is selenium (Se).

6. The carbon material according to claim 5, wherein about ¼ of the micropores of the carbon nanosheet are filled with the selenium.

7. The carbon material according to claim 5, wherein the selenium is amorphous.

8. The carbon material according to claim 1, wherein the carbon material is an electrode.

9. The carbon material according to claim 1, wherein the active material is one of silicon (Si), tin (Sn), antimony (Sb), germanium (Ge), and/or compounds or alloys thereof.

10. The carbon material according to claim 1, wherein the active material is titanium oxide (TiO$_2$).

11. The carbon material according to claim 1, wherein said carbon nanosheet has a micropore volume of at least 0.1 cm$^3$ g$^{-1}$.

12. An energy storage device, comprising:
    an anode;
    a cathode, at least one of said anode and said cathode including a fully amorphous carbon nanosheet having a plurality of pores, wherein more than 50% of the pores are micropores, each micropore having a size of less than 2 nm;
    an active material impregnated into at least a portion of the micropores of the carbon nanosheet, wherein the active material is:
        (a) selenium;
        (b) silicon (Si), tin (Sn), antimony (Sb), germanium (Ge), and/or compounds or alloys thereof;
        (c) titanium oxide (TiO$_2$); or
        (d) combinations thereof; and
    an electrolyte.

13. The energy storage device according to claim 12, wherein the carbon nanosheet is a cellulose-derived carbon nanosheet and the active material is at least partially comprised in pores of the carbon nanosheet.

14. The energy storage device according to claim 12, wherein the active material is amorphous.

15. The energy storage device according to claim 14, wherein the active material is selenium (Se).

16. The energy storage device according to claim 15, wherein said cathode comprises the carbon nanosheet, and wherein said cathode includes at least 50 wt % of the selenium.

17. The energy storage device according to claim 12, wherein the energy storage device is a sodium ion battery or capacitor, a lithium ion battery or capacitor, an ultracapacitor, or a hybrid ion capacitor.

18. The energy storage device according to claim 12, wherein the energy storage device has a form factor selected from the group of a D-cell battery, a pouch cell, a rectangular automotive starter battery scale cell, a C-cell sized battery, an AA-cell sized battery, an AAA-cell sized battery, a 18650 lithium ion battery, and a 26650 lithium ion battery.

19. The energy storage device according to claim 12, wherein said cathode has a reversible capacity of at least 500 mA h g$^{-1}$.

20. The energy storage device according to claim 19, wherein the reversible capacity is about 613 mA h g$^{-1}$.

21. The energy storage device according to claim 20, wherein said cathode has an at least 88% retention over 500 cycles.

22. The energy storage device according to claim 12, wherein said anode is a pseudographitic carbon (PGC) including partially ordered domains of graphene with an interlayer spacing larger than that of graphite.

23. The energy storage device according to claim 22, wherein the active material is selenium (Se).

24. The energy storage device according to claim 12, wherein the active material is one of selenium (Se), silicon (Si), tin (Sn), antimony (Sb), germanium (Ge), and/or compounds or alloys thereof.

25. The energy storage device according to claim 12, wherein the active material is titanium oxide ($TiO_2$).

26. A carbon material, comprising:
a carbon nanosheet derived from a biological precursor including a plurality of pores, wherein more than 50% of the pores are micropores, each micropore having a size of less than 2 nm; and
an active material impregnated into at least a portion of the micropores of said carbon nanosheet,
wherein the biological precursor is a nanocrystalline cellulose and the active material is selenium (Se).

27. The carbon material according to claim 26, wherein ¼ of the micropores of the carbon nanosheet are filled with the selenium.

* * * * *